(12) United States Patent
Tolman et al.

(10) Patent No.: US 11,022,248 B2
(45) Date of Patent: Jun. 1, 2021

(54) PLUGGING UNDESIRED OPENINGS IN FLUID VESSELS

(71) Applicant: THRU TUBING SOLUTIONS, INC., Oklahoma City, OK (US)

(72) Inventors: Randy C Tolman, Spring, TX (US); Roger L. Schultz, Newcastle, OK (US); Brock W. Watson, Sadler, TX (US)

(73) Assignee: THRU TUBING SOLUTIONS, INC., Newcastle, OK (US)

( * ) Notice: Subject to any disclaimer, the term of this patent is extended or adjusted under 35 U.S.C. 154(b) by 29 days.

(21) Appl. No.: 16/500,805

(22) PCT Filed: Apr. 25, 2018

(86) PCT No.: PCT/US2018/029383
§ 371 (c)(1),
(2) Date: Oct. 3, 2019

(87) PCT Pub. No.: WO2018/200688
PCT Pub. Date: Nov. 1, 2018

(65) Prior Publication Data
US 2020/0109809 A1    Apr. 9, 2020

Related U.S. Application Data

(60) Provisional application No. 62/540,380, filed on Aug. 2, 2017, provisional application No. 62/489,905, filed on Apr. 25, 2017.

(51) Int. Cl.
*F16L 55/162* (2006.01)
*F16L 55/16* (2006.01)

(52) U.S. Cl.
CPC ......... *F16L 55/1612* (2013.01); *F16L 55/162* (2013.01)

(58) Field of Classification Search
CPC ....... F16L 55/162; F16L 55/164; F16L 55/48; E21B 33/138; E21B 33/13
(Continued)

(56) References Cited

U.S. PATENT DOCUMENTS 2,157,493 A    5/1939  Miller et al.
2,621,351 A    12/1952 Piety
(Continued)

FOREIGN PATENT DOCUMENTS

WO    2007066254 A2    7/2007
WO    2013184238 A1    12/2013
(Continued)

OTHER PUBLICATIONS

Merriam-Webster, "Filament", web page, retrieved Aug. 12, 2016 from www.merriam-webster.com/dictionary/filament, 4 pages.
(Continued)

*Primary Examiner* — Patrick F Brinson
(74) *Attorney, Agent, or Firm* — Smith IP Services, PC.

(57) ABSTRACT

A method of plugging at least one undesired opening in a fluid vessel can include introducing one or more plugging devices into the vessel, conveying the plugging devices by flow to the opening, and blocking the flow through the opening with the plugging devices. A system for plugging at least one undesired opening in a fluid vessel can include a deployment apparatus configured to introduce one or more plugging devices into the vessel, a sensor that measures a physical parameter indicative of leakage from the vessel, and a controller that activates an actuator of the deployment apparatus in response to receipt from the sensor of an indication of leakage from the vessel.

34 Claims, 12 Drawing Sheets

(58) Field of Classification Search
USPC .................................. 138/97, 98; 166/284
See application file for complete search history.

(56) References Cited

U.S. PATENT DOCUMENTS

| | | | |
|---|---|---|---|
| 2,754,910 A * | 7/1956 | Derrick | C09K 8/60 |
| | | | 166/284 |
| 2,768,693 A | 10/1956 | Hughes, Jr. | |
| 2,788,072 A | 4/1957 | Goodwin | |
| 2,838,117 A | 6/1958 | Clark, Jr. et al. | |
| 2,970,645 A | 2/1961 | Glass | |
| 3,011,548 A | 12/1961 | Holt | |
| 3,028,914 A | 4/1962 | Flickinger | |
| 3,086,587 A | 4/1963 | Zandmer et al. | |
| 3,144,049 A * | 8/1964 | Ginsburgh | G01M 3/202 |
| | | | 138/97 |
| 3,170,517 A | 2/1965 | Graham et al. | |
| 3,174,546 A | 3/1965 | Flickinger | |
| 3,292,700 A | 12/1966 | Berry | |
| 3,376,934 A | 4/1968 | Willman et al. | |
| 3,399,726 A | 9/1968 | Harris et al. | |
| 3,417,821 A | 12/1968 | Tinsley et al. | |
| 3,434,539 A | 3/1969 | Merritt | |
| 3,437,147 A | 4/1969 | Davies | |
| 3,595,314 A | 7/1971 | Garner | |
| 3,814,187 A | 6/1974 | Holamn | |
| 3,895,678 A | 7/1975 | Wright et al. | |
| 4,187,909 A | 2/1980 | Erbstoesser | |
| 4,194,561 A | 3/1980 | Stokley et al. | |
| 4,244,425 A | 1/1981 | Erbstoesser | |
| 4,505,334 A | 3/1985 | Doner et al. | |
| 4,628,994 A | 12/1986 | Towner et al. | |
| 4,716,964 A | 1/1988 | Erbstoesser et al. | |
| 4,921,577 A | 5/1990 | Eubank | |
| 4,924,811 A | 5/1990 | Axelrod | |
| 5,004,048 A | 4/1991 | Bode | |
| 5,052,220 A | 10/1991 | Piers | |
| 5,052,489 A | 10/1991 | Carisella et al. | |
| 5,253,709 A | 10/1993 | Kendrick et al. | |
| 5,477,815 A | 12/1995 | O'Rourke | |
| 5,507,345 A | 4/1996 | Wehunt, Jr. et al. | |
| 5,908,073 A | 6/1999 | Nguyen et al. | |
| 6,070,666 A | 6/2000 | Montgomery | |
| 6,394,184 B2 | 5/2002 | Tolman et al. | |
| 6,427,776 B1 | 8/2002 | Hoffman et al. | |
| 6,543,538 B2 | 4/2003 | Tolman et al. | |
| 6,655,475 B1 | 12/2003 | Wald | |
| 6,931,952 B2 * | 8/2005 | Rantala | G01L 5/008 |
| | | | 73/431 |
| 6,973,966 B2 | 12/2005 | Szarka | |
| 7,225,869 B2 | 6/2007 | Willett et al. | |
| 7,273,099 B2 | 9/2007 | East, Jr. et al. | |
| 7,364,051 B2 | 4/2008 | Diaz et al. | |
| 7,451,823 B2 | 11/2008 | Wilson | |
| 7,527,095 B2 | 5/2009 | Bloess et al. | |
| 7,559,363 B2 | 7/2009 | Howell et al. | |
| 7,571,773 B1 | 8/2009 | West et al. | |
| 7,624,810 B2 | 12/2009 | Fould et al. | |
| 7,673,673 B2 | 3/2010 | Surjaatmadja et al. | |
| 7,673,688 B1 | 3/2010 | Jones et al. | |
| 7,748,452 B2 | 7/2010 | Sullivan et al. | |
| 7,810,523 B2 * | 10/2010 | McEwan | F16L 55/164 |
| | | | 138/97 |
| 7,810,567 B2 | 10/2010 | Daniels et al. | |
| 7,874,365 B2 | 1/2011 | East, Jr. et al. | |
| 7,891,424 B2 | 2/2011 | Creel et al. | |
| 8,088,717 B2 | 1/2012 | Polizzotti et al. | |
| 8,240,392 B2 | 8/2012 | Barnard et al. | |
| 8,256,515 B2 | 9/2012 | Barbee | |
| 8,281,860 B2 | 10/2012 | Boney et al. | |
| 8,307,916 B1 | 11/2012 | Wald | |
| 8,397,820 B2 | 3/2013 | Fehr et al. | |
| 8,561,696 B2 | 10/2013 | Trummer et al. | |
| 8,646,529 B2 | 2/2014 | Clark et al. | |
| 8,757,260 B2 | 6/2014 | Luo et al. | |
| 8,776,886 B2 | 7/2014 | Rondeau | |
| 8,851,172 B1 | 10/2014 | Dudzinski | |
| 8,853,137 B2 | 10/2014 | Todd et al. | |
| 8,887,803 B2 | 11/2014 | East, Jr. et al. | |
| 8,950,437 B2 * | 2/2015 | Ryan | F16L 55/162 |
| | | | 138/97 |
| 8,950,438 B2 | 2/2015 | Ryan | |
| 8,950,491 B2 | 2/2015 | Frost | |
| 9,187,975 B2 | 11/2015 | Rochen | |
| 9,284,798 B2 | 3/2016 | Jamison et al. | |
| 9,334,704 B2 | 5/2016 | Mineo et al. | |
| 9,523,267 B2 | 12/2016 | Schultz et al. | |
| 9,551,204 B2 | 1/2017 | Schultz et al. | |
| 9,567,824 B2 | 2/2017 | Watson et al. | |
| 9,567,825 B2 | 2/2017 | Schultz et al. | |
| 9,567,826 B2 | 2/2017 | Schultz et al. | |
| 9,708,883 B2 | 7/2017 | Schultz et al. | |
| 9,745,820 B2 | 8/2017 | Watson et al. | |
| 9,816,341 B2 | 11/2017 | Funkhouser et al. | |
| 9,863,569 B2 * | 1/2018 | Czaplewski | B29C 65/00 |
| 9,920,589 B2 | 3/2018 | Watson et al. | |
| 2003/0160391 A1 * | 8/2003 | McEwan | F16L 55/48 |
| | | | 277/314 |
| 2004/0129460 A1 | 7/2004 | MacQuoid et al. | |
| 2004/0261990 A1 | 12/2004 | Boseman et al. | |
| 2005/0184083 A1 | 8/2005 | Diaz et al. | |
| 2005/0230117 A1 | 10/2005 | Wilkinson | |
| 2006/0102336 A1 | 5/2006 | Campbell | |
| 2006/0113077 A1 | 6/2006 | Willberg et al. | |
| 2006/0169449 A1 | 8/2006 | Mang et al. | |
| 2007/0039739 A1 | 2/2007 | Wilson | |
| 2007/0169935 A1 | 7/2007 | Akbar et al. | |
| 2007/0187099 A1 | 8/2007 | Wang | |
| 2008/0000639 A1 | 1/2008 | Clark et al. | |
| 2008/0093073 A1 | 4/2008 | Bustos et al. | |
| 2008/0128133 A1 | 6/2008 | Turley et al. | |
| 2008/0196896 A1 | 8/2008 | Bustos et al. | |
| 2010/0122813 A1 | 5/2010 | Trummer et al. | |
| 2010/0147866 A1 | 6/2010 | Witkowski et al. | |
| 2010/0152070 A1 | 6/2010 | Ghassemzadeh | |
| 2010/0175889 A1 | 7/2010 | Gartz et al. | |
| 2010/0200235 A1 | 8/2010 | Luo et al. | |
| 2010/0307747 A1 | 12/2010 | Shindgikar et al. | |
| 2011/0048712 A1 | 3/2011 | Barbee | |
| 2011/0226479 A1 | 9/2011 | Tippel et al. | |
| 2011/0297396 A1 | 12/2011 | Hendel et al. | |
| 2012/0031614 A1 | 2/2012 | Rondeau et al. | |
| 2012/0067581 A1 | 4/2012 | Auzerais et al. | |
| 2012/0085548 A1 | 4/2012 | Fleckenstein et al. | |
| 2012/0090835 A1 | 4/2012 | Kefi | |
| 2012/0181032 A1 | 7/2012 | Naedler et al. | |
| 2012/0211219 A1 | 8/2012 | McGuire et al. | |
| 2012/0234538 A1 | 9/2012 | Martin et al. | |
| 2012/0285659 A1 | 11/2012 | Lafferty et al. | |
| 2012/0285695 A1 | 11/2012 | Lafferty et al. | |
| 2013/0062055 A1 | 3/2013 | Tolman et al. | |
| 2013/0186632 A1 | 7/2013 | Makowiecki et al. | |
| 2013/0233553 A1 | 9/2013 | Bugrin et al. | |
| 2013/0292123 A1 | 11/2013 | Murphree et al. | |
| 2013/0327528 A1 | 12/2013 | Frost | |
| 2014/0022537 A1 | 1/2014 | Samson et al. | |
| 2014/0151052 A1 | 6/2014 | Themig et al. | |
| 2014/0231086 A1 | 8/2014 | Jamison et al. | |
| 2014/0274815 A1 | 9/2014 | Lovett et al. | |
| 2015/0060072 A1 | 3/2015 | Busby et al. | |
| 2015/0075793 A1 | 3/2015 | Dotson et al. | |
| 2015/0083423 A1 | 3/2015 | Brannon et al. | |
| 2015/0090453 A1 | 4/2015 | Tolman et al. | |
| 2015/0122364 A1 | 5/2015 | Cheatham, III et al. | |
| 2015/0191988 A1 | 7/2015 | Kiesel et al. | |
| 2015/0240583 A1 | 8/2015 | Mineo et al. | |
| 2015/0284879 A1 | 10/2015 | Takahashi et al. | |
| 2016/0040520 A1 | 2/2016 | Tolman et al. | |
| 2016/0130933 A1 | 5/2016 | Madasu | |
| 2016/0251930 A1 | 9/2016 | Jacob et al. | |
| 2016/0319628 A1 | 11/2016 | Schultz et al. | |
| 2016/0319630 A1 | 11/2016 | Watson et al. | |
| 2016/0319631 A1 | 11/2016 | Schultz et al. | |
| 2016/0319632 A1 | 11/2016 | Watson et al. | |

(56) References Cited

U.S. PATENT DOCUMENTS

| | | | |
|---|---|---|---|
| 2016/0348465 | A1 | 12/2016 | Schultz et al. |
| 2016/0348466 | A1 | 12/2016 | Schultz et al. |
| 2016/0348467 | A1 | 12/2016 | Schultz et al. |
| 2017/0030169 | A1 | 2/2017 | Funkhouser et al. |
| 2017/0107784 | A1 | 4/2017 | Watson et al. |
| 2017/0107786 | A1 | 4/2017 | Schultz et al. |
| 2017/0260828 | A1 | 9/2017 | Watson et al. |
| 2017/0275961 | A1 | 9/2017 | Schultz et al. |
| 2017/0275965 | A1 | 9/2017 | Watson et al. |
| 2017/0335651 | A1 | 11/2017 | Watson et al. |
| 2018/0148994 | A1 | 5/2018 | Schultz et al. |
| 2019/0257172 | A1 | 8/2019 | Watson |

FOREIGN PATENT DOCUMENTS

| | | | |
|---|---|---|---|
| WO | 2014042552 | A1 | 3/2014 |
| WO | 2014099206 | A1 | 6/2014 |
| WO | 2016175876 | A1 | 11/2016 |
| WO | 2016176181 | A1 | 11/2016 |
| WO | 2017014820 | A1 | 1/2017 |
| WO | 2017070105 | A1 | 4/2017 |

OTHER PUBLICATIONS

Merriam-Webster, "Lateral", web page, retrieved Aug. 12, 2016 from www.merriam-webster.com/dictionary/lateral, 5 pages.
Wikipedia, "Nylon 6", web page, retrieved Aug. 12, 2016 from https://en.wikipedia.org/wiki/Nylon_6, 4 pages.
Raghavendra R. Hegde, et al.; "Nylon Fibers", online article, dated Apr. 2004, 8 pages.
thefreedictionary.com; "Threaded", online dictionary definition, dated Sep. 15, 2016, 5 pages.
Wolfram Research, "Drag Coefficient", web page, retrieved Aug. 12, 2016 from http://scienceworld.wolfram.com/physics/DragCoefficient.html, 1 page.
Merriam Webster, "Bundle", web page, retrieved Jul. 5, 2016 from www.merriam-webster.com/dictionary/bundle, 7 pages.
International Search Report with Written Opinion issued Aug. 2, 2018 for PCT Patent Application No. PCT/US2018/029383, 20 pages.
International Search Report with Written Opinion issued Aug. 1, 2018 for PCT Patent Application No. PCT/US2018/029395, 20 pages.
"Yarn"; Definition of Yarn by Merriam-Webster.com, Merrian-Webster, n.d. Web., Aug. 11, 2017, 6 pages.
"Thread." Merriam-Webster.com. Merriam-Webster, n.d. Web. Feb. 16, 2017, 12 pages.
"Knot." Merriam-Webster.com. Merriam-Webster, n.d. Web. Feb. 16, 2017, 13 pages.
"Fabric." Merriam-Webster.com. Merriam-Webster, n.d. Web. Apr. 5, 2016, 6 pages.
"Rope." Merriam-Webster.com. Merriam-Webster, n.d. Web. Apr. 5, 2016, 10 pages.
Monosol; "Film Data Sheet", product information brochure, dated Mar. 6, 2012, 1 page.
Perf Sealers; "History of Perforation Ball Sealers in the Oil and Gas Industry", company website article, dated 2014-2019, 4 pages.
Oxford Dictionaries; "body", definition of body in English, dated May 23, 2019, 7 pages.

* cited by examiner

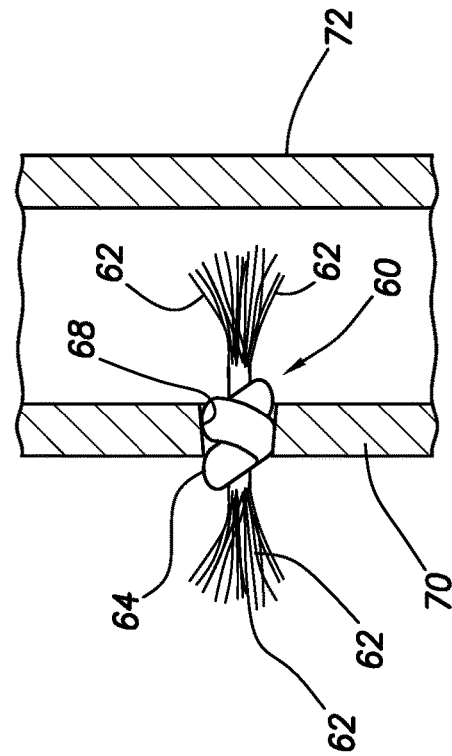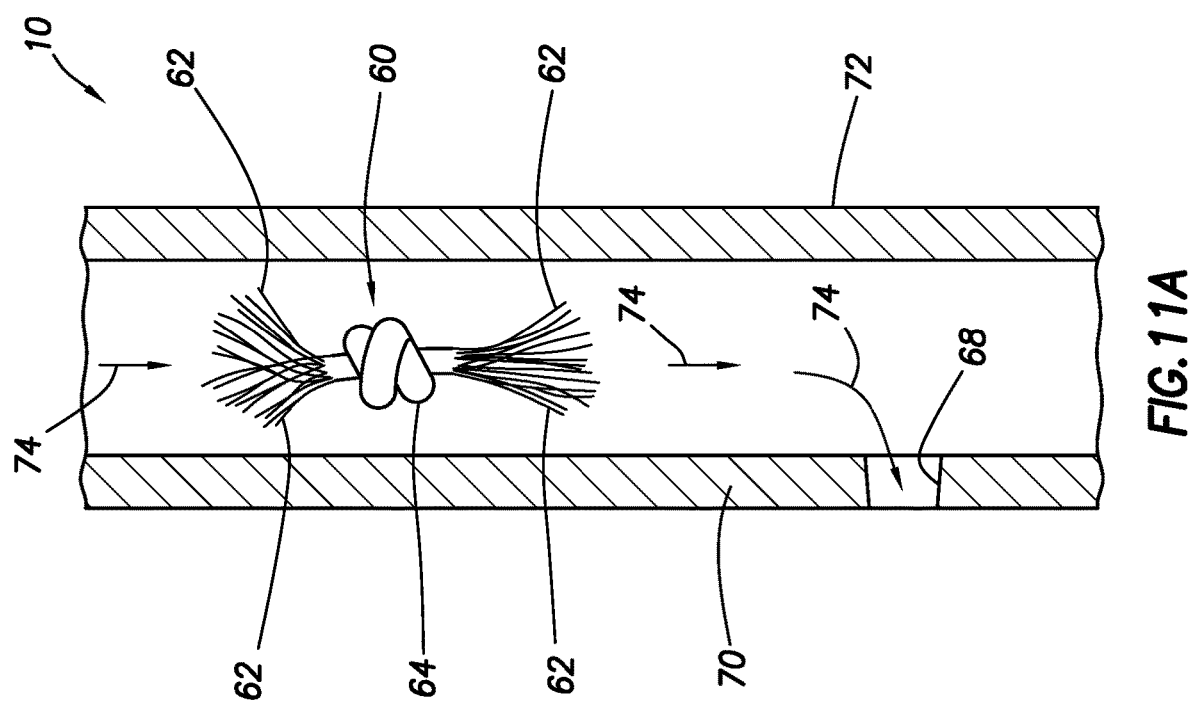

PLUGGING UNDESIRED OPENINGS IN FLUID VESSELS

CROSS-REFERENCE TO RELATED APPLICATIONS

This application is a national stage under 35 USC 371 of International Application No. PCT/US18/29383, filed on 25 Apr. 2018, which claims priority to U.S. Provisional Application No. 62/540,380 filed 2 Aug. 2017 and U.S. Provisional Application No. 62/489,905 filed 25 Apr. 2017. The entire disclosures of these prior applications are incorporated herein by this reference.

TECHNICAL FIELD

This disclosure relates generally to blocking flow through a leak path in a vessel and, in one example described below, more particularly provides for use of a plugging device to plug undesired openings in fluid vessels.

BACKGROUND

It can be difficult to mitigate leakage from a fluid vessel that is part of a continuously operating process. Typically, the process must be terminated, the leakage fixed or the vessel replaced, and then the process must be re-started. These mitigation efforts can be costly and time-consuming.

Therefore, it will be appreciated that improvements are continually needed in the art of plugging undesired openings in fluid vessels. These improvements can be useful even in situations in which the fluid vessel is not part of a continually operating process.

BRIEF DESCRIPTION OF THE DRAWINGS

FIGS. 11A & B are representative partially cross-sectional views of the system and method, in which the plugging device is used to plug an opening in another fluid vessel.

DETAILED DESCRIPTION

Figure 1:
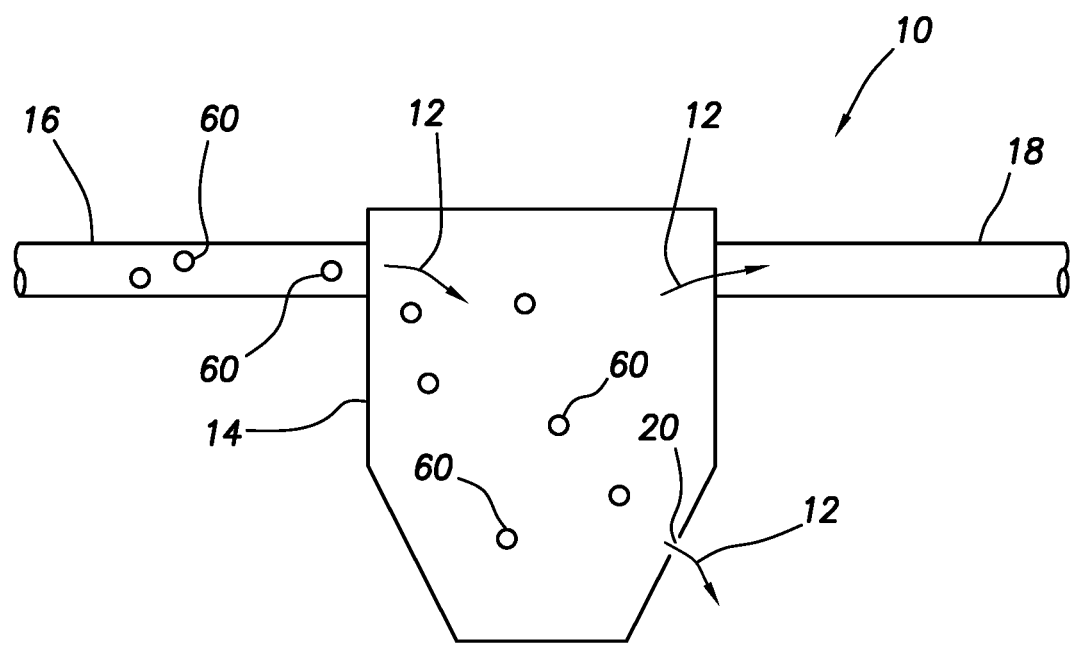
FIG. 1 is a representative cross-sectional view of an example of a system and associated method which can embody principles of this disclosure, in which a fluid is leaking from a fluid vessel.

Example methods described below allow inadvertent or otherwise undesired openings in or between fluid vessels to be blocked permanently or temporarily in a variety of different applications. Certain flow conveyed plugging device examples described below can be made of a fibrous material and may comprise a central body, a "knot" or other enlarged geometry for blocking flow through the undesired openings.

The plugging devices may in some examples be conveyed into a vessel with pumped fluid. Fibrous material extending outwardly from a body of a plugging device can "find" and follow the fluid flow, pulling the enlarged geometry or fibers into a restricted portion of a flow path, causing the enlarged geometry and additional strands to become tightly wedged into the flow path, thereby sealing off fluid communication.

The plugging devices can be made of degradable or non-degradable materials, or a combination of degradable and non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time, such as, by spotting or circulating a fluid in the vessel so that the material is exposed to the fluid.

In some examples, the material can be an acid degradable material (e.g., nylon, etc.), a mix of acid degradable material (for example, nylon fibers mixed with particulate such as calcium carbonate), self-degrading material (e.g., poly-lactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

Multiple materials can be pumped together or separately. For example, nylon and calcium carbonate could be pumped as a mixture, or the nylon could be pumped first to initiate a seal, followed by calcium carbonate to enhance the seal.

In certain examples described below, the plugging device can be made of knotted fibrous materials. Multiple knots can be used with any number of loose ends. The ends can be splayed, frayed (e.g., finely divided strands or fibers) or un-frayed. The fibrous material can be rope, fabric, yarn, metal wool, cloth or another woven or braided structure.

The plugging device can be used to block flow through any leak paths in a vessel or associated piping (such as, leaking threaded, gasketed, sealed or flanged connections, corrosion holes, cracked or otherwise damaged areas, etc.). Any opening or leak path through which fluid flows can be blocked with a suitably configured plugging device. For example, an opening between two different volumes (such as, tubes and reservoir in a heat exchanger), could be plugged using the plugging device.

The plugging device can be used to block flow through any leak path in a vessel designed to treat fluids, with reduced velocities, traps, trays, gas separation or any fluid density separation means. Leak paths may include any undesirable escape of fluid from the contained system and may occur in threaded, sealed, gasketed, flanged, welded, corroded (internal or external) walls or connections to, or that make up, a vessel-like device.

The plugging device may be used to seal openings in steam generation, handling and distribution equipment. Some examples include steam generators and associated steam passageways, such as heat exchangers. Steam distribution equipment may include steam flood piping in oil field steam injection applications, where steam is injected into a formation and then produced (known to those skilled in the art as "huff and puff" enhanced recovery operations), and also steam flood operations and SAGD (steam assisted gravity drain) operations. Geothermal well and pipe applications may also benefit from use of the plugging devices described herein.

The plugging device may be used for sealing off openings and leak paths both on surface and sub-surface, as well as surface and sub-sea wellsite operations (such as, onshore or offshore drilling, completion and production operations). For example, a method could include releasing plugging devices to seal a leak in a blowout preventer stack, or any of its components (such as, pipe rams, blind rams, annular preventer, seals, gaskets, flanges, threaded connections, etc.).

The plugging device may be used for sealing off openings and leak paths in riser pipes, both subsea and above water level. The plugging device may be used for sealing off openings and leak paths in drilling, completion, stimulation, conformance, injection, production or workover rig operations (whether onshore, floating or stationary platforms, offshore, etc.).

A volume of plugging devices can be introduced into a given process, and then can be captured at an end of the process (for example, in a screen-like device or filter). Once captured they may be re-circulated through the process any number of times, until the need no longer exists or scheduled maintenance has been completed.

The materials of the plugging device can be selected for the given product/process flow through the vessel. In some examples, the fluid in the vessel could be glycol and/or amine type treating chemicals, oil, salt water or gas condensates. In other examples, gas may be present in the vessel.

The density of the plugging device material can be selected to ensure dispersion of multiple plugging devices in the vessel, or to ensure that a plugging device will be positioned at a level of the opening to be plugged. Floating, sinking or neutrally buoyant plugging devices may be used. Plugging device materials may be combined with hollow spheres to enhance buoyancy, or combined with more dense solid materials to "sink" the plugging devices.

Plugging devices introduced into a vessel can have a variety of different sizes for a corresponding variable opening size potential. The opening could be anything from a small "pin-hole" leak created by external or internal corrosion, to a failed weld or crack from repeated heat duty cycling.

The plugging device may also be embedded with any of a variety of different types of detection technology. This technology could comprise radioactive material (preferably with a short half-life) readily located with gamma ray equipment, or magnetic material readily identifiable with a magnetic field sensor. Ultra-sonic, radio frequency or infrared technology may be used to detect and identify the plugging device. An ultrasonic or RFID (radio frequency identification) transmitter may be embedded in the plugging device.

Representatively illustrated in FIG. 1 is a system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 system 10, a fluid 12 is flowed into a fluid vessel 14 via a conduit 16, and the fluid flows out of the vessel via another conduit 18. An opening 20 in a wall of the vessel 14 allows some of the fluid 12 to leak out of the vessel.

Note that it is not necessary in keeping with the principles of this disclosure for the opening 20 to be formed through a wall of the vessel 14, for the fluid 12 to enter the vessel from one conduit 16 and exit the vessel via another conduit 18, or for the fluid to leak to an exterior of the vessel. In other examples, the opening 20 could be at a threaded connection or in a component other than the vessel 14, the fluid 12 could enter and exit the vessel 14 via the same conduit, and the fluid could pass between otherwise isolated regions internal to the vessel 14 or other process equipment. Thus, the scope of this disclosure is not limited to any of the details of the system 10, vessel 14, conduits 16, 18 or other elements as described herein or depicted in the drawings.

In the FIG. 1 example, a number of flow conveyed plugging devices 60 have been released into the conduit 16. Flow of the fluid 12 into the vessel 14 carries the plugging devices 60 also into the vessel.

If only a single opening 20 is to be plugged, one or more plugging devices 60 may be introduced into the vessel 14. If there are a known number of multiple openings 20 to be plugged, that known number of plugging devices 60, or more, may be introduced into the vessel 14. If the number of openings 20 to be plugged is unknown, a selected number of plugging devices 60 may be introduced into the vessel 14, effectiveness of the plugging may be evaluated, and additional plugging devices may be introduced into the vessel if all openings have not yet been plugged.

In some examples, the plugging devices 60 may be introduced into the vessel 14 or conduit 16 only when it is desired to plug one or more openings 20. In these examples, release of the plugging devices 60 is initiated in response to a selected stimulus (such as, a detected pressure loss due to release of the fluid 12, observation or other detection of a leak, reduced flow, etc.).

In other examples, the plugging devices 60 may be continuously circulated or periodically introduced (e.g., at regular or predetermined intervals) into conduits, vessels or other process equipment, as a preventative measure. In these examples, a plugging device 60 will plug a newly-occurring opening 20 soon after it occurs, without release of plugging devices being initiated by the occurrence of the opening.

Figure 2:
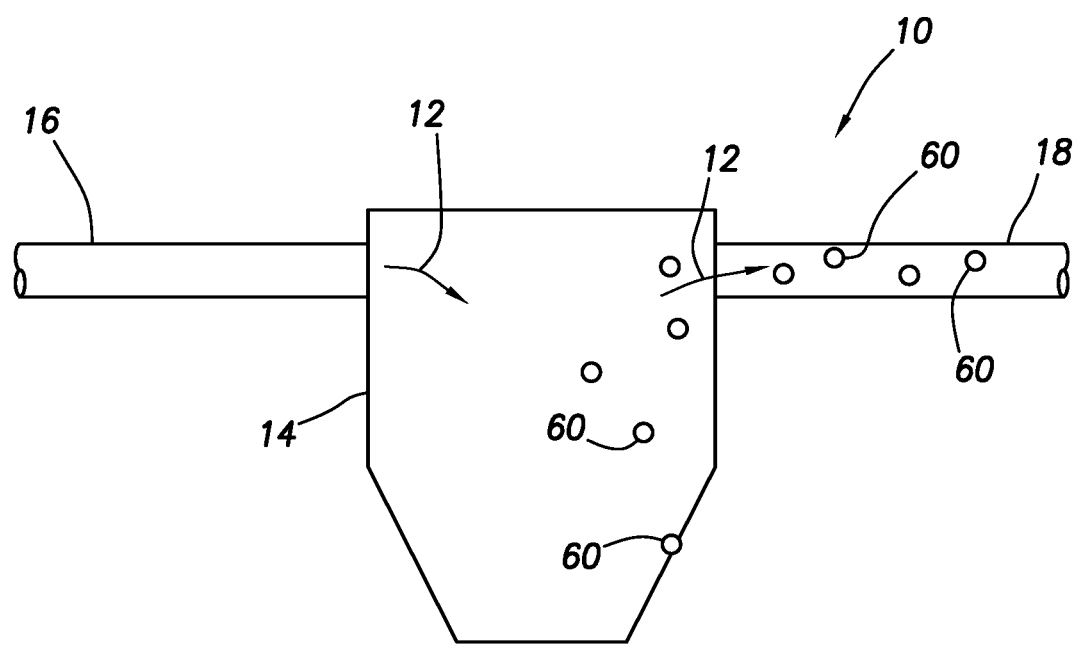
FIG. 2 is a representative cross-sectional view of the system and method, in which a plugging device has engaged an undesired opening in the vessel, thereby plugging the opening.

As depicted in FIG. 2, one of the plugging devices 60 has sealingly engaged the opening 20. Leakage of the fluid 12 from the vessel 14 is, thus, prevented.

The remaining plugging devices 60 (if any) can be flowed out of the vessel 14 with the fluid 12 via the conduit 18. In examples in which the plugging devices 60 are continuously or periodically flowed through the system 10, plugging devices may accordingly continuously or periodically flow into and out of the vessel 14 and through the conduits 16, 18.

Figure 3:
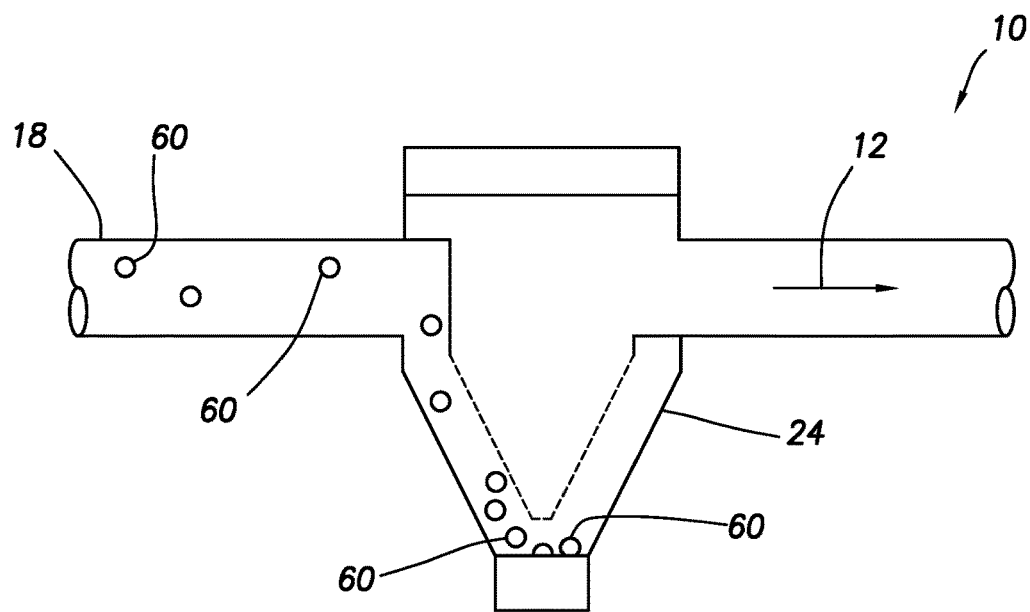
FIG. 3 is a representative cross-sectional view of the system and method, in which the plugging devices are retrieved by use of a filter.

As depicted in FIG. 3, a strainer, screen, filter 24 or other apparatus may be used to retrieve the plugging devices 60 from the vessel 14, conduits 16, 18 or other process equipment. In FIG. 3, the filter 24 is connected to the conduit 18, so that plugging devices 60 exiting the vessel 14 will be separated from flow of the fluid 12. The retrieved plugging devices 60 can be discarded or they can be reintroduced into the system 10.

Figure 4:
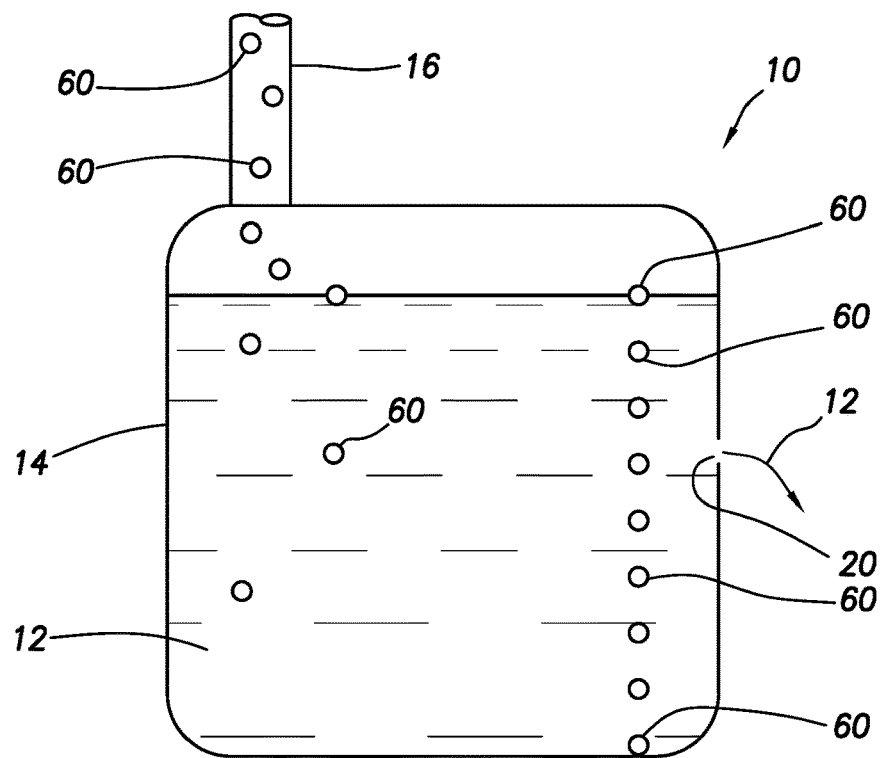
FIG. 4 is a representative cross-sectional view of another example of the system and method, in which the plugging devices have different buoyancies.

In an example of the system 10 depicted in FIG. 4, the vessel 14 is in the form of a tank, and the fluid 12 comprises a liquid contained in the tank. However, the opening 20 in a wall of the vessel 14 permits some of the fluid 12 to leak from the vessel.

In the FIG. 4 example, plugging devices 60 having a variety of different buoyancies in the fluid 12 are introduced into the vessel 14 via the conduit 16. On the right-hand side of FIG. 4, some of the plugging devices 60 are depicted as being in line vertically, to demonstrate that the plugging devices can be vertically distributed in the fluid 12 along an entire distance from a bottom of the vessel 14 to a top level of the fluid 12.

The plugging devices 60 may have positive, negative and neutral buoyancies. If a vertical height to the opening 20 is known, a buoyancy of a plugging device 60 may be selected, so that the plugging device will "float" in the fluid 12 at that vertical height. Ranges of buoyancies may be selected to cause multiple plugging devices 60 to "float" near the bottom of the vessel 14, near the top of the fluid 12, or at a selected range of depths in the fluid.

If the plugging devices 60 are continuously or periodically flowed through the system 10 for preventative purposes, the use of a variety of different buoyancies is desirable, since the depth of an opening 20 will typically be unknown at the time the plugging devices are introduced into the system.

A plugging device 60 may in some examples be provided with a "bladder" type core that changes density based on pressure and/or temperature. This would allow the device to become much denser under pressure and more buoyant when pressure is bled off. Examples in which such a variable density may be beneficial can include: 1) In a vessel under "normal" conditions the devices could sit on bottom (e.g., "in the boot") and then automatically engage as a leak causes a pressure decrease. 2) In an oil and gas well, devices could be less buoyant when being pumped downhole under fracturing conditions, and then become more buoyant during flow back of the well for easier clean up and removal. The bladder could be filled with a gas, such as $CO_2$, that converts to a liquid under pressure, and then to a gas when the pressure is reduced, etc., with a large phase envelope. The reverse of this may have some application, as well (e.g., change in phase from gas to liquid). Pressure and or temperature change could reduce the buoyancy at a pre-determined set point, and thereby cause the device to sink harmlessly out of the way of operations and or fluid flow if desired.

Figure 5:
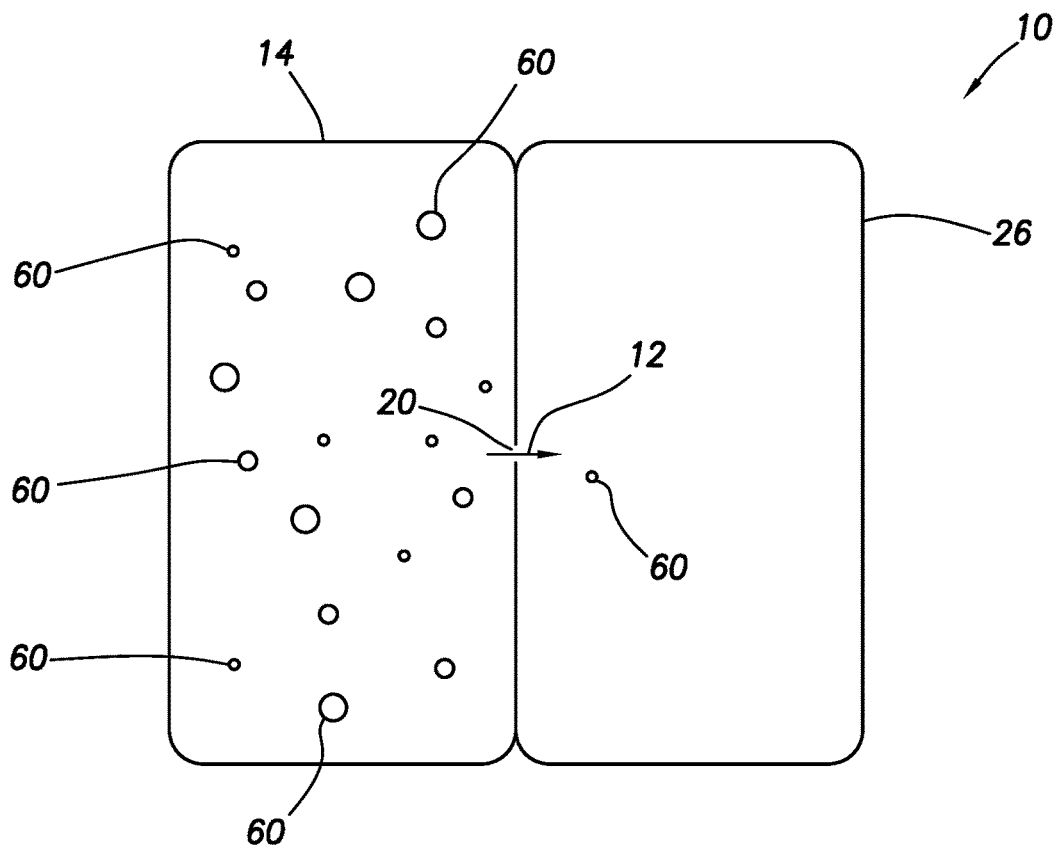
FIG. 5 is a representative cross-sectional view of the system and method, in which the plugging devices have different sizes.

In an example of the system 10 depicted in FIG. 5, plugging devices 60 having a variety of different sizes are disposed in the vessel 14. The opening 20 permits some of the fluid 12 to leak from the vessel 14 and into another adjacent vessel 26.

If a size (such as, a diameter, width, etc.) of the opening 20 is not known, the use of a variety of different sizes of the plugging devices 60 ensures that at least one of the plugging devices will have an appropriate size to block flow through the opening. If the plugging devices 60 are continuously or periodically flowed through the system 10 for preventative purposes, the use of a variety of different sizes of plugging devices is desirable, since the size of an opening 20 will typically be unknown at the time the plugging devices are introduced into the system.

Figure 6:
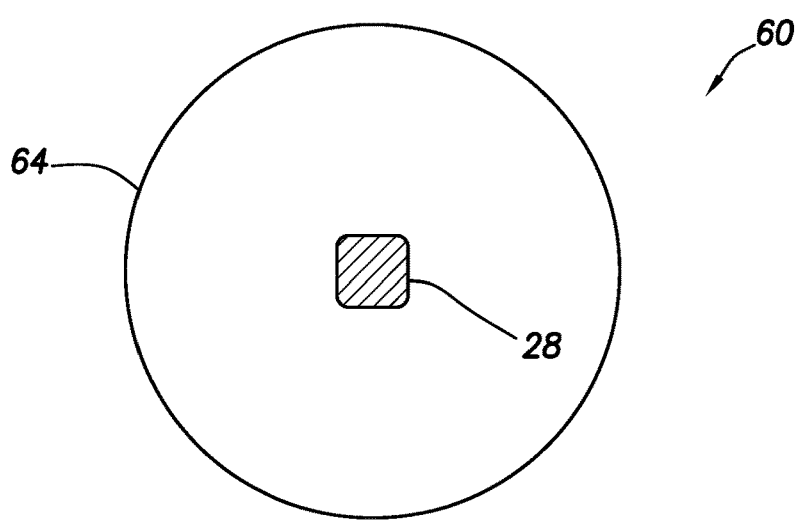
FIG. 6 is a representative cross-sectional view of an example of the plugging device, in which the plugging device includes a detection device.

As depicted in FIG. 6, an example of a plugging device 60 includes a detection device 28 for detecting a presence, characteristic and/or identity of the plugging device. The detection device 28 enables the plugging device 60 to be detected at any point in the system 10 using suitable detection equipment.

The detection device 28 may be "passive" in that it does not actively transmit a signal for detection by a receiver. Instead, the detection device 28 could propagate a magnetic field (in the case of a magnet), radioactivity (in the case of a radioactive material) or other detectable characteristic due to a material of the device. Other characteristics (such as, density, etc.) of a detection device 28 may be detectable to indicate the presence, characteristic or identity of the corresponding plugging device 60.

The detection device 28 may be "active" in that it is configured to transmit a distinct signal to be detected by the detection equipment. For example, the detection device 28 could comprise an acoustic or ultrasonic transmitter, a radio frequency transmitter, an infrared light source, or any other device capable of emitting a signal detectable by the detection equipment.

The detection device 28 may be at times passive, and at other times active. For example, the device 28 could comprise a radio frequency identification (RFID) device that is initially passive, but becomes active in response to scanning by an RFID reader. A signal emitted by the RFID device could include information, such as, a unique identity of the plugging device 60, a material, size, density, buoyancy or other characteristic of the plugging device, etc.

Figure 7:
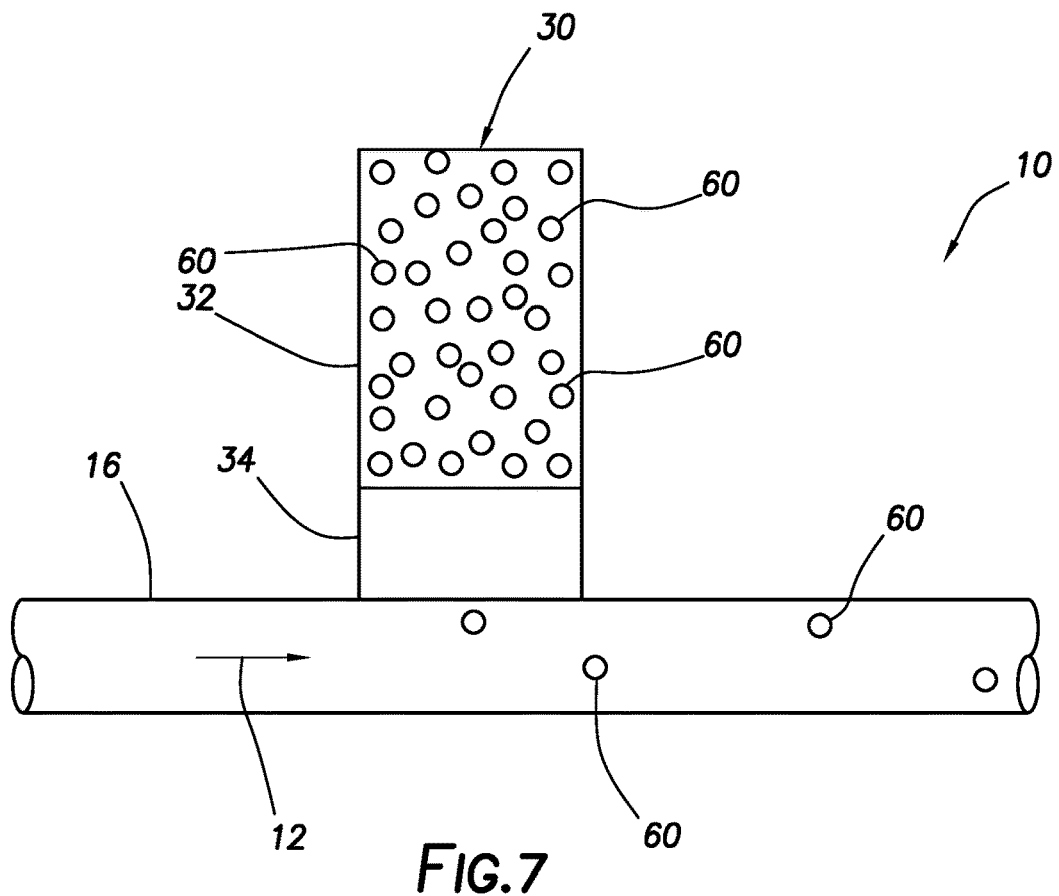
FIG. 7 is a representative cross-sectional view of a deployment apparatus that may be used with the system and method.

As depicted in FIG. 7, an example of a deployment apparatus 30 is used to deploy the plugging devices 60 into the conduit 16 for transport with the fluid 12 to the vessel 14 in the system 10. In this example, the deployment apparatus 30 includes a container 32 for storing the plugging devices 60, and an actuator 34 for dispensing the plugging devices from the container into the conduit 16.

In other examples, the apparatus 30 could deploy the plugging devices 60 directly into the vessel 14 or other process equipment having the opening to be plugged. The plugging devices 60 may be deployed continuously, periodically, intermittently, or in response to detection of a selected stimulus.

Figure 8:
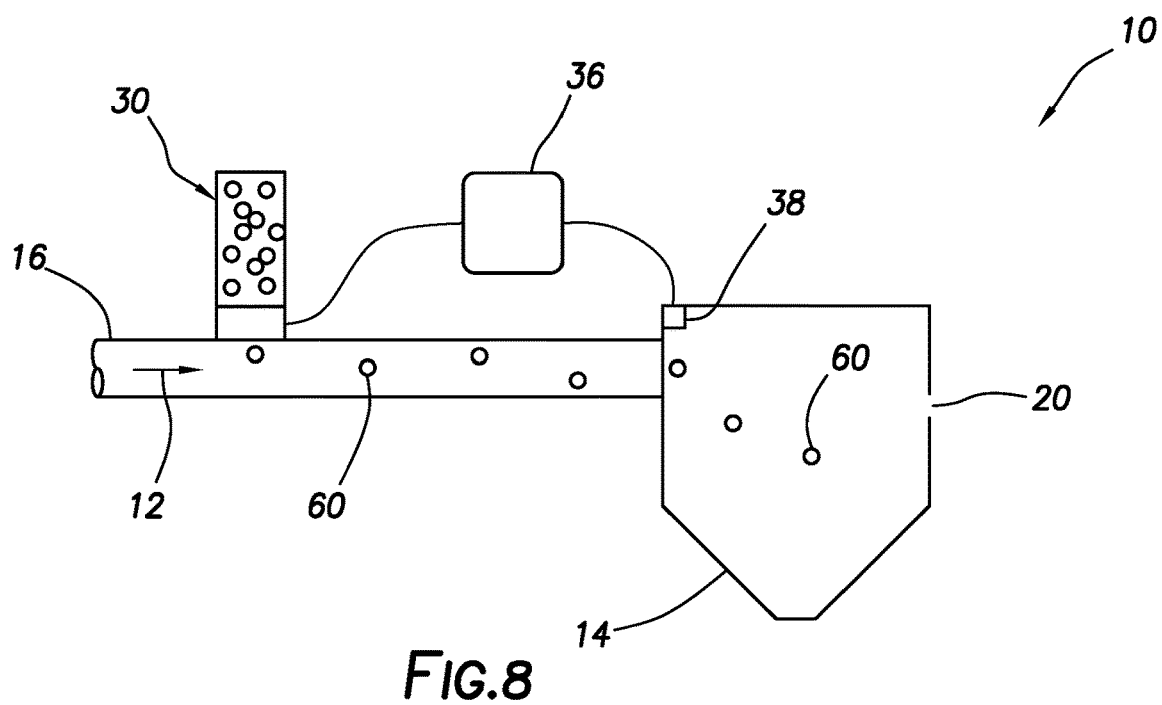
FIG. 8 is a representative cross-sectional view of the deployment apparatus connected to the fluid vessel via a conduit.

As depicted in FIG. 8, the apparatus 30 is activated by a controller 36 in response to reception of an indication that the fluid 12 is leaking from the vessel 14. In this example, a sensor 38 measures a physical property, and measurements are transmitted to the controller 36, which determines (based on appropriate algorithms) whether the measurements indicate that the opening 20 is present.

For example, the sensor 38 could comprise a pressure sensor, a flow rate sensor or a temperature sensor (or any combination thereof). Leakage of the fluid 12 from the vessel 14 could, thus, be indicated by a decrease in pressure in the vessel 14, an increase in flow rate into the vessel, or an increase in temperature in the vessel. Other sensor examples could include "fire eyes" or fire detection sensors for plant/refinery applications.

If the controller 36 determines that the opening 20 is present, or that the fluid 12 is leaking from the vessel 14, the apparatus 30 is activated to release one or more of the plugging devices 60 into the conduit 16. The apparatus 30 may be deactivated by the controller 36 when the controller determines that the opening 20 is plugged or the fluid 12 is no longer leaking from the vessel 14.

In some examples, the sensor 38 and controller 36 may comprise the detection equipment described above for detecting the detection device 28 in the plugging device 60. For example, the sensor 38 could comprise an RFID reader, a radiation detector, an acoustic or ultrasonic receiver, an infrared light sensor, or any other device capable of detecting a signal emitted by the detection device 28.

Figure 9A:
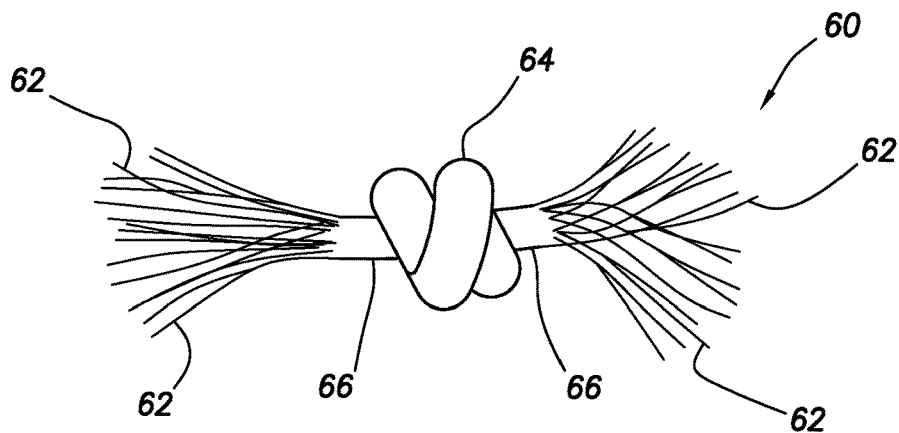
FIGS. 9A & B are representative side view of examples of the plugging device.

Referring additionally now to FIG. 9A, an example of a flow conveyed plugging device 60 that can incorporate the principles of this disclosure is representatively illustrated. The device 60 may be used for any of the plugging devices in the system 10 and method examples described herein, or the device may be used in other systems and methods.

The device 60 example of FIG. 9A includes multiple fibers 62 extending outwardly from an enlarged body 64. As depicted in FIG. 9A, each of the fibers 62 has a lateral dimension (e.g., a thickness or diameter) that is substantially smaller than a size (e.g., a thickness or diameter) of the body 64.

The body 64 can be dimensioned so that it will effectively engage and seal off a particular opening in a vessel or other process equipment. For example, if it is desired for the device 60 to seal off an opening with known characteristics, the body 64 can be formed so that it is somewhat larger than a diameter, width or other size of the opening. If it is desired for multiple devices 60 to seal off multiple openings having a variety of dimensions (such as holes caused by corrosion of the equipment), then the bodies 64 of the devices can be formed with a corresponding variety of sizes.

In the FIG. 9A example, the fibers 62 are joined together (e.g., by braiding, weaving, cabling, etc.) to form lines 66 that extend outwardly from the body 64. In this example, there are two such lines 66, but any number of lines (including one) may be used in other examples.

The lines 66 may be in the form of one or more ropes, in which case the fibers 62 could comprise splayed, frayed or finely divided ends of the rope(s). In addition, the body 64 could be formed by one or more knots in the rope(s). In some examples, the body 64 can comprise a fabric, yarn or cloth, the body could be formed by one or more knots in the fabric, yarn or cloth, and the fibers 62 could extend from the fabric, yarn or cloth.

In other examples, the device 60 could comprise a single sheet of material, or multiple strips of sheet material. The device 60 could comprise one or more films. The body 64 and lines 66 may not be made of the same material, and the body and/or lines may not be made of a fibrous material.

Each of the body 64, the lines 66 and the fibers 62 could comprise a degradable material, a non-degradable material or a combination of degradable and non-degradable materials. For example, the body 64 could be degradable in the well, and the lines 66 and fibers 62 could be non-degradable, or vice-versa.

In the FIG. 9A example, the body 64 is formed by a double overhand knot in a rope, and ends of the rope are frayed, so that the fibers 62 are splayed outward. In this manner, the fibers 62 will cause significant fluid drag when the device 60 is deployed into a flow stream, so that the device will be effectively "carried" by, and "follow," the flow.

However, it should be clearly understood that other types of bodies and other types of fibers may be used in other examples. The body 64 could have other shapes, the body could be hollow or solid, and the body could be made up of one or multiple materials. The fibers 62 are not necessarily joined by lines 66, and the fibers are not necessarily formed by fraying, splaying or finely dividing ends of ropes or other lines. The body 64 is not necessarily centrally located in the device 60 (for example, the body could be at one end of the lines 66). Thus, the scope of this disclosure is not limited to the construction, configuration or other details of the device 60 as described herein or depicted in the drawings.

In some examples, a knot or other enlarged body 76 (see, e.g., FIG. 19) could be tied or otherwise located in or on each of the strands or lines 66 protruding from the main body 64. This configuration could provide a similar sealing principle for leaks around the main body 64 attempting to seal off an "un-round" opening or leak path. Once the strands or lines 66 start to displace through the leak path, a knot or other enlarged body 76 on the strand would help seat/bridge the leak path around the main body 64. This configuration could also aid in prevention of displacement of the device 60 due to higher differential pressures. The enlarged bodies 76 on the lines 66 could act as smaller (if they are in fact smaller than the body 64) plugging devices around a periphery of the opening being sealed. The enlarged bodies 76 on the lines 66 could also enhance fluid drag on the device 60, so that the device is influenced more to displace with the flow toward an opening or other leak path.

Figure 9B:
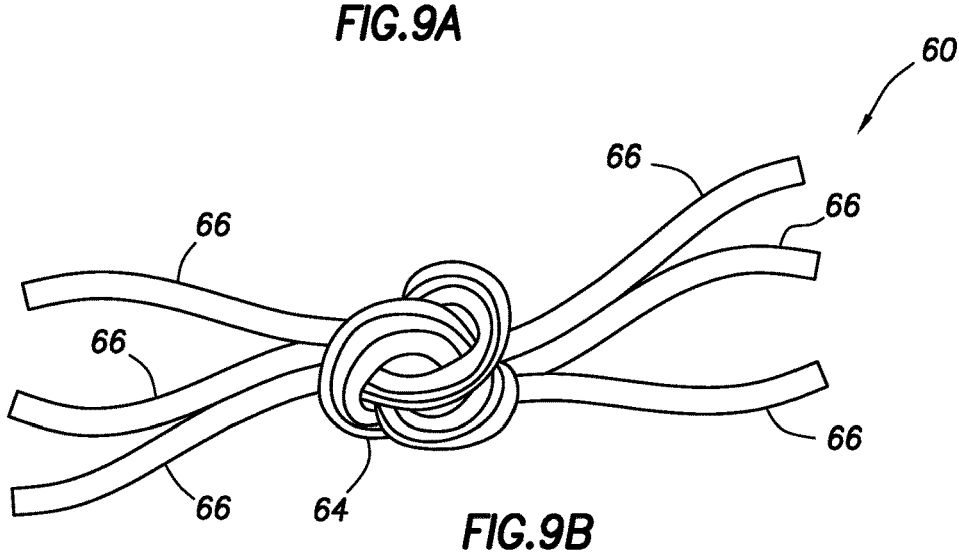

Referring additionally now to FIG. 9B, another example of the device 60 is representatively illustrated. In this example, the device 60 is formed using multiple braided lines 66 of the type known as "mason twine." The multiple lines 66 are knotted (such as, with a double or triple overhand knot or other type of knot) to form the body 64. Ends of the lines 66 are not necessarily frayed in these examples, although the lines do comprise fibers (such as the fibers 62 described above).

Figure 10:
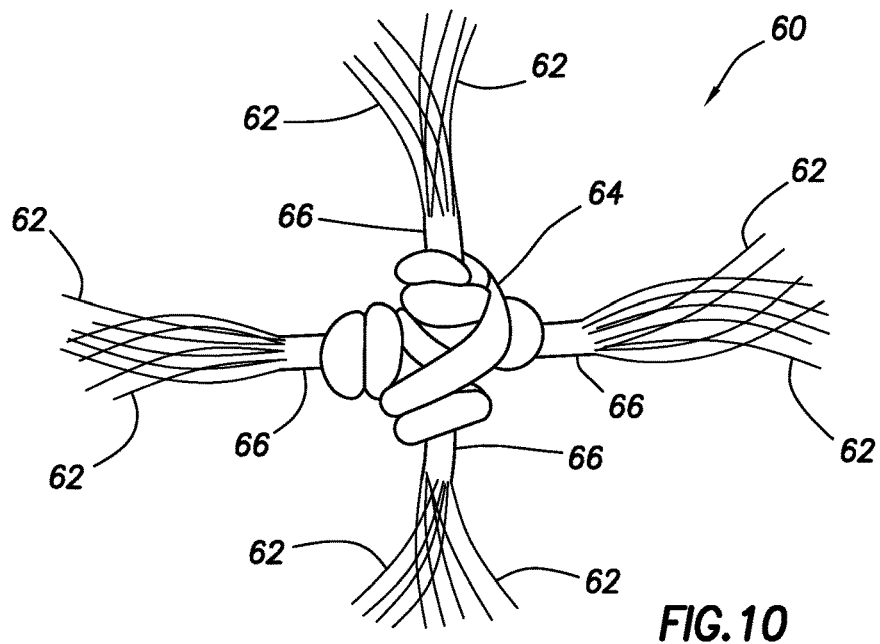
FIG. 10 is a representative side view of another example of the plugging device.

Referring additionally now to FIG. 10, another example of the device 60 is representatively illustrated. In this example, four sets of the fibers 62 are joined by a corresponding number of lines 66 to the body 64. The body 64 is formed by one or more knots in the lines 66.

FIG. 10 demonstrates that a variety of different configurations are possible for the device 60. Accordingly, the principles of this disclosure can be incorporated into other configurations not specifically described herein or depicted in the drawings. Such other configurations may include fibers joined to bodies without use of lines, bodies formed by techniques other than knotting, etc.

Referring additionally now to FIGS. 11A & B, an example of a use of the device 60 of FIG. 9A to seal off an opening 68 in a vessel 72 is representatively illustrated. In this example, the opening 68 is formed through a sidewall 70 of the vessel 72 (such as, a casing, liner, tubing, etc.). However, in other examples the opening 68 could be another type of opening, and may be formed in another type of structure.

The device 60 is deployed into the vessel 72 and is conveyed through the vessel by fluid flow 74. The fibers 62 of the device 60 enhance fluid drag on the device, so that the device is influenced to displace with the flow 74.

The fluid flow 74 may be the same as, or similar to, the flow of the fluid 12 described above for the examples of FIGS. 1-5, 7 & 8. However, the fluid flow 74 could be another type of fluid flow, in keeping with the principles of this disclosure.

Since the flow 74 (or a portion thereof) exits the vessel 72 via the opening 68, the device 60 will be influenced by the fluid drag to also exit the vessel via the opening 68. As depicted in FIG. 11B, one set of the fibers 62 first enters the opening 68, and the body 64 follows. However, the body 64 is appropriately dimensioned, so that it does not pass through the opening 68, but instead is lodged or wedged into the opening. In some examples, the body 64 may be received only partially in the opening 68, and in other examples the body may be entirely received in the opening.

The body 64 may completely or only partially block the flow 74 through the opening 68. If the body 64 only partially blocks the flow 74, any remaining fibers 62 exposed to the flow in the vessel 72 can be carried by that flow into any gaps between the body and the opening 68, so that a combination of the body and the fibers completely blocks flow through the opening. Additional knots or other enlarged bodies in or on the strands or lines 66 may similarly block flow through the opening 68 as discussed above.

In another example, the device 60 may partially block flow through the opening 68, and another material (such as, calcium carbonate, poly-lactic acid (PLA) or poly-glycolic acid (PGA) particles) may be deployed and conveyed by the flow 74 into any gaps between the device and the opening, so that a combination of the device and the material completely blocks flow through the opening.

The device 60 may permanently prevent flow through the opening 68, or the device may degrade to eventually permit flow through the opening. Removal or degrading of the device 60 may be useful when maintenance is performed on the system 10 to mitigate the leak.

If the device 60 degrades, it may be self-degrading, or it may be degraded in response to any of a variety of different stimuli. Any technique or means for degrading the device 60 (and any other material used in conjunction with the device to block flow through the opening 68) may be used in keeping with the scope of this disclosure.

In other examples, the device 60 may be mechanically removed from the opening 68. For example, if the body 64 only partially enters the opening 68, a cutting device may be used to cut the body from the opening.

Figure 12:
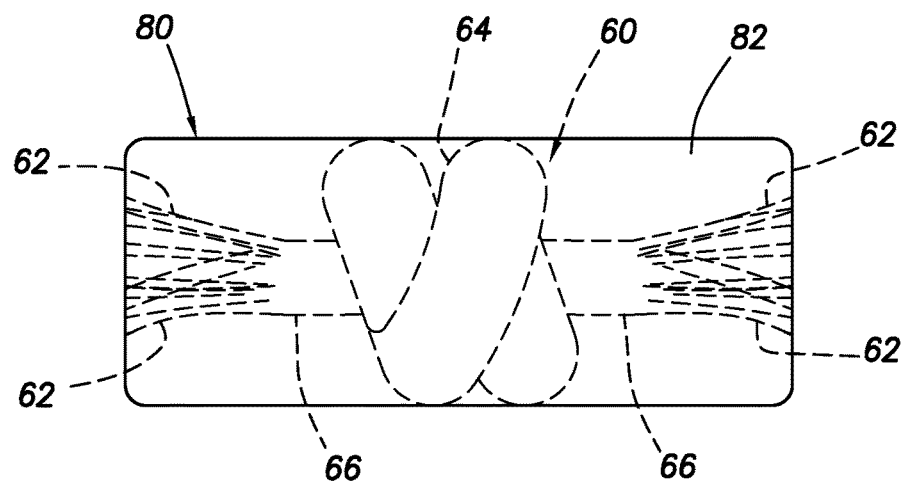
FIGS. 12-14 are representative side views of examples of the plugging device with a retainer.
Figure 13:
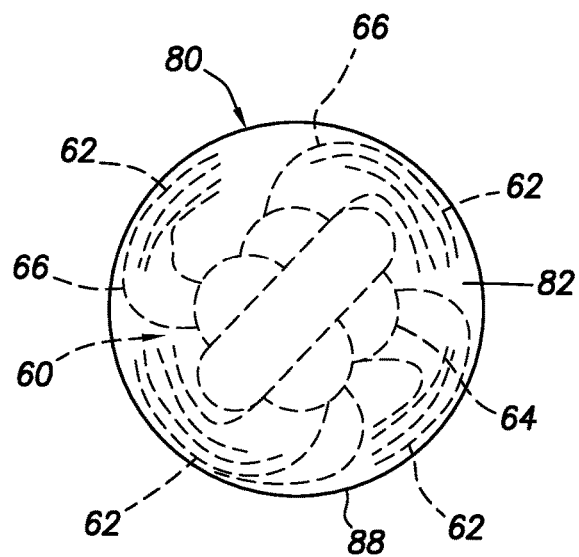
Figure 14:
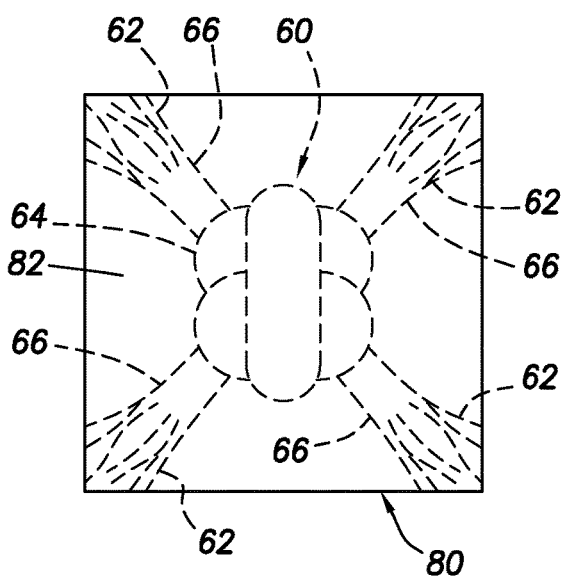

Referring additionally now to FIGS. 12-14, additional examples of the device 60 are representatively illustrated. In these examples, the device 60 is surrounded by, encapsulated in, molded in, or otherwise retained by, a retainer 80.

The retainer 80 aids in deployment of the device 60, particularly in situations where multiple devices are to be deployed simultaneously. In such situations, the retainer 80 for each device 60 prevents the fibers 62 and/or lines 66 from becoming entangled with the fibers and/or lines of other devices.

The retainer 80 could in some examples completely enclose the device 60. In other examples, the retainer 80 could be in the form of a binder that holds the fibers 62 and/or lines 66 together, so that they do not become entangled with those of other devices.

In some examples, the retainer 80 could have a cavity therein, with the device 60 (or only the fibers 62 and/or lines 66) being contained in the cavity. In other examples, the retainer 80 could be molded about the device 60 (or only the fibers 62 and/or lines 66).

During or after deployment of the device 60 into the system 10, the retainer 80 dissolves, melts, disperses or otherwise degrades, so that the device is capable of sealing off an opening 68, as described above. For example, the retainer 80 can be made of a material 82 that degrades in a process environment.

The retainer material 82 may degrade after deployment, but before arrival of the device 60 at the opening 68 to be plugged. In other examples, the retainer material 82 may degrade at or after arrival of the device 60 at the opening 68 to be plugged. If the device 60 also comprises a degradable material, then preferably the retainer material 82 degrades prior to the device material.

The material 82 could, in some examples, melt at elevated process temperatures. The material 82 could be chosen to have a melting point that is between ambient temperature and a temperature at the opening 68, so that the material melts during transport from the deployment apparatus 30 to the location of the opening.

The material 82 could, in some examples, dissolve when exposed to the fluid 12. The material 82 could be chosen so that the material begins dissolving as soon as it is deployed into the system 10 and contacts a certain fluid (such as, water, brine, hydrocarbon fluid, acids, bases, etc.) therein. In some examples, the fluid that initiates dissolving of the material 82 could have a certain pH range that causes the material to dissolve.

Note that it is not necessary for the material 82 to melt or dissolve in the system 10. Various other stimuli (such as, passage of time, elevated pressure, flow, turbulence, etc.) could cause the material 82 to disperse, degrade or otherwise cease to retain the device 60. The material 82 could degrade in response to any one, or a combination, of: passage of a predetermined period of time in the system 10, exposure to a predetermined temperature in the system, exposure to a predetermined fluid in the system, and exposure to a predetermined chemical composition in the system. Thus, the scope of this disclosure is not limited to any particular stimulus or technique for dispersing or degrading the material 82, or to any particular type of material.

In some examples, the material 82 can remain on the device 60, at least partially, when the device engages the opening 68. For example, the material 82 could continue to cover the body 64 (at least partially) when the body engages and seals off the opening 68. In such examples, the material 82 could advantageously comprise a relatively soft, viscous and/or resilient material, so that sealing between the device 60 and the opening 68 is enhanced.

Suitable relatively low melting point substances that may be used for the material 82 can include wax (e.g., paraffin wax, vegetable wax), ethylene-vinyl acetate copolymer (e.g., ELVAX™ available from DuPont), atactic polypropylene, and eutectic alloys. Suitable relatively soft substances that may be used for the material 82 can include a soft silicone composition or a viscous liquid or gel.

Suitable dissolvable materials can include PLA, PGA, anhydrous boron compounds (such as anhydrous boric oxide and anhydrous sodium borate), polyvinyl alcohol, polyethylene oxide, salts and carbonates. The dissolution rate of a water-soluble polymer (e.g., polyvinyl alcohol, polyethylene oxide) can be increased by incorporating a water-soluble plasticizer (e.g., glycerin), or a rapidly-dissolving salt (e.g., sodium chloride, potassium chloride), or both a plasticizer and a salt.

In FIG. 12, the retainer 80 is in a cylindrical form. The device 60 is encapsulated in, or molded in, the retainer material 82. The fibers 62 and lines 66 are, thus, prevented from becoming entwined with the fibers and lines of any other devices 60.

In FIG. 13, the retainer 80 is in a spherical form. In addition, the device 60 is compacted, and its compacted shape is retained by the retainer material 82. A shape of the retainer 80 can be chosen as appropriate for a particular device 60 shape, in compacted or un-compacted form.

In FIG. 14, the retainer 80 is in a cubic form. Thus, any type of shape (polyhedron, spherical, cylindrical, etc.) may be used for the retainer 80, in keeping with the principles of this disclosure.

Figure 15:
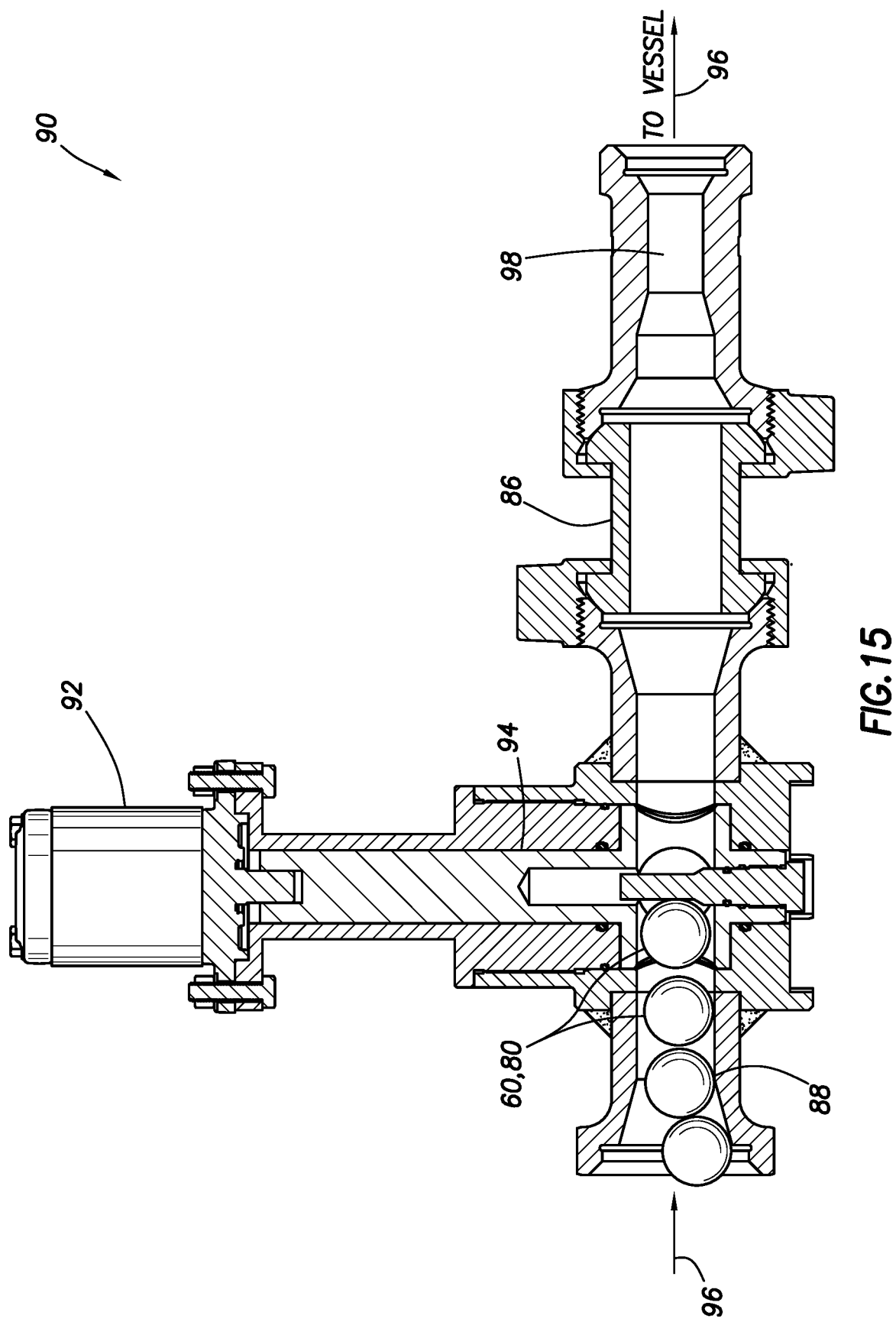
FIGS. 15 & 16 are representative partially cross-sectional views of additional examples of the deployment apparatus.

Referring additionally now to FIG. 15, another example of a deployment apparatus 90 and an associated method are representatively illustrated. The apparatus 90 and method may be used with a system and method described herein, or they may be used with other systems and methods.

When used with the examples of the system 10 and method representatively illustrated in FIGS. 1-5, 7 & 8, the apparatus 90 can be connected between a pump (or other pressure or flow source) and the vessel 14. However configured, an output of the apparatus 90 is connected to the vessel 14, although the apparatus itself may be positioned a distance away from the vessel.

The apparatus 90 is used in this example to deploy the devices 60 into the vessel 14. The devices 60 may or may not be retained by the retainer 80 when they are deployed. However, in the FIG. 15 example, the devices 60 are depicted with the retainers 80 in the spherical shape of FIG. 13, for convenience of deployment. The retainer material 82 can be at least partially dispersed during the deployment, so that the devices 60 are more readily conveyed by fluid flow 96.

In certain situations, it can be advantageous to provide a certain spacing between the devices 60 during deployment, for example, in order to efficiently plug multiple spaced apart openings. One reason for this is that the devices 60 will tend to first plug openings that are receiving highest rates of flow.

In addition, if the devices 60 are deployed too close together, some of them can become trapped between openings, thereby wasting some of the devices. The excess "wasted" devices 60 might later interfere with other process operations.

To mitigate such problems, the devices 60 can be deployed with a selected spacing. The spacing may be, for example, on the order of the average spacing between the openings. The apparatus 90 is desirably capable of deploying the devices 60 with any selected spacing between the devices.

Each device 60 in this example has the retainer 80 in the form of a dissolvable coating material with a frangible coating 88 thereon, to impart a desired geometric shape (spherical in this example), and to allow for convenient deployment. The dissolvable retainer material 82 could be detrimental to the operation of the device 60 if it increases a drag coefficient (Cd) of the device. A high coefficient of drag can cause the devices 60 to be swept past openings, instead of sealing the openings.

The frangible coating 88 is used to prevent the dissolvable coating from dissolving during a queue time prior to deployment. Using the apparatus 90, the frangible coating 88 can be desirably broken, opened or otherwise damaged during the deployment process, so that the dissolvable coating is then exposed to fluids that can cause the coating to dissolve.

Examples of suitable frangible coatings include cementitious materials (e.g., plaster of Paris) and various waxes (e.g., paraffin wax, carnauba wax, vegetable wax, machinable wax). The frangible nature of a wax coating can be optimized for particular conditions by blending a less brittle wax (e.g., paraffin wax) with a more brittle wax (e.g., carnauba wax) in a certain ratio selected for the particular conditions.

As depicted in FIG. 15, the apparatus 90 includes a rotary actuator 92 (such as, a hydraulic or electric servo motor, with or without a rotary encoder). The actuator 92 rotates a sequential release structure 94 that receives each device 60 in turn from a queue of the devices, and then releases each device one at a time into a conduit 86 that is connected to the vessel 14.

Note that it is not necessary for the actuator 92 to be a rotary actuator, since other types of actuators (such as, a linear actuator) may be used in other examples. In addition, it is not necessary for only a single device 60 to be deployed at a time. In other examples, the release structure 94 could be configured to release multiple devices at a time. Thus, the scope of this disclosure is not limited to any particular details of the apparatus 90 or the associated method as described herein or depicted in the drawings.

In the FIG. 15 example, a rate of deployment of the devices 60 is determined by an actuation speed of the actuator 92. As a speed of rotation of the structure 94 increases, a rate of release of the devices 60 from the structure accordingly increases. Thus, the deployment rate can be conveniently adjusted by adjusting an operational speed of the actuator 92. This adjustment could be automatic, in response to process conditions, opening parameters, flow rate variations, etc.

As depicted in FIG. 15, the fluid flow 96 enters the apparatus 90 from the left and exits on the right. Note that the flow 96 is allowed to pass through the apparatus 90 at any position of the release structure 94 (the release structure is configured to permit flow through the structure at any of its positions).

In other examples, the release structure 94 could be in the form of an auger rotated by the rotary actuator 92.

When the release structure 94 rotates, one or more of the devices 60 received in the structure rotates with the structure. When a device 60 is on a downstream side of the release structure 94, the flow 96 though the apparatus 90 carries the device to the right (as depicted in FIG. 15) and into a restriction 98.

The restriction 98 in this example is smaller than the diameter of the device 60. The flow 96 causes the device 60 to be forced through the restriction 98, and the frangible coating 88 is thereby damaged, opened or fractured to allow the inner dissolvable material 82 of the retainer 80 to dissolve.

Other ways of opening, breaking or damaging a frangible coating may be used in keeping with the principles of this disclosure. For example, cutters or abrasive structures could contact an outside surface of a device 60 to penetrate, break, abrade or otherwise damage the frangible coating 88. Thus, this disclosure is not limited to any particular technique for damaging, breaking, penetrating or otherwise compromising a frangible coating.

Figure 16:
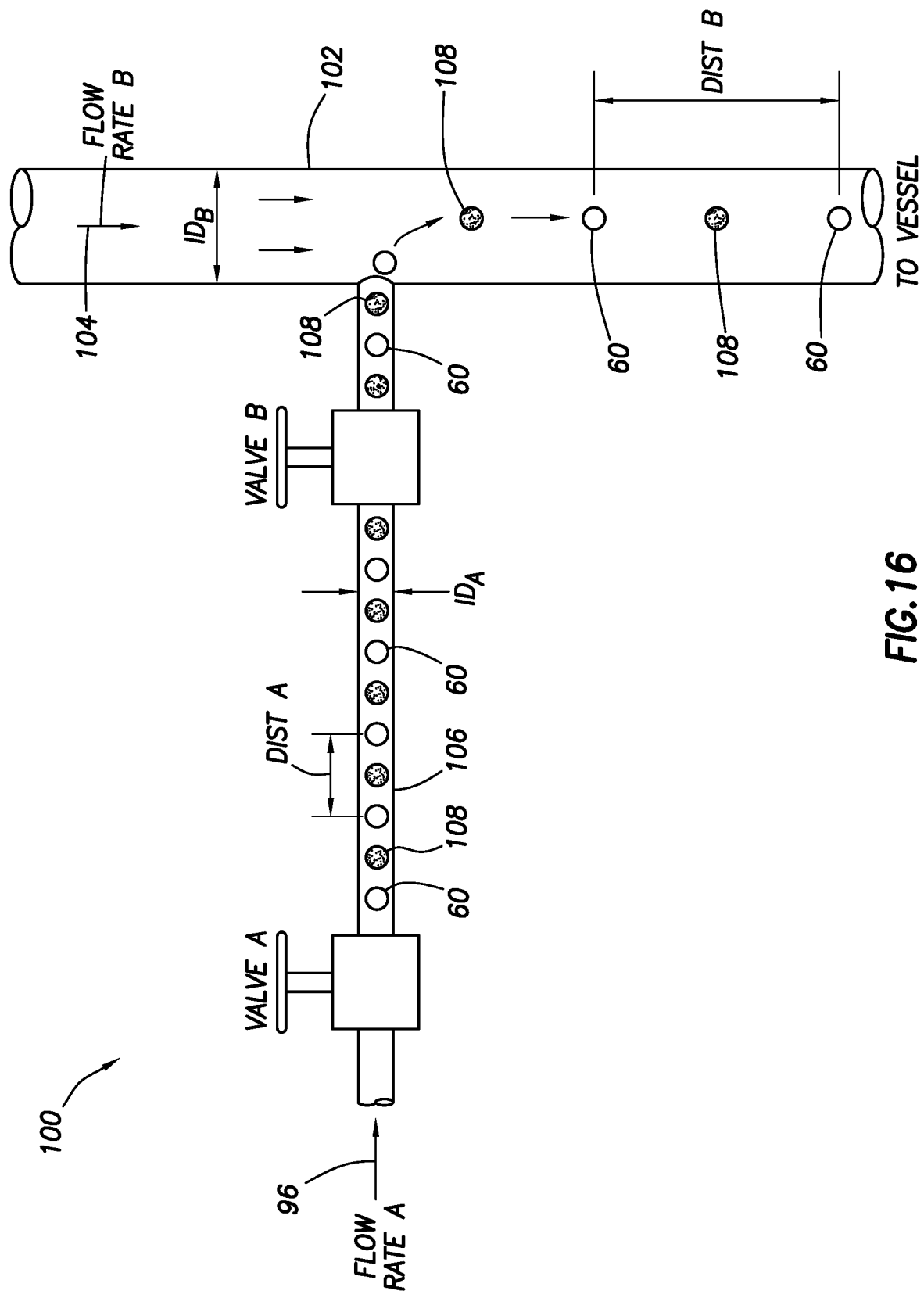

Referring additionally now to FIG. 16, another example of a deployment apparatus 100 and an associated method are representatively illustrated. The apparatus 100 and method may be used with a system and method described herein, or they may be used with other systems and methods.

In the FIG. 16 example, the devices 60 are deployed using two flow rates. Flow rate A through two valves (valves A & B) is combined with Flow rate B through a pipe 102 depicted as being vertical in FIG. 16 (the pipe may be horizontal or have any other orientation in actual practice).

The pipe 102 may be connected to a pump or other fluid flow source. In some examples, a separate pump (not shown) may be used to supply the flow 96 through the valves A & B.

Valve A is not absolutely necessary, but may be used to control a queue of the devices 60. When valve B is open the flow 96 causes the devices 60 to enter the vertical pipe 102. Flow 104 through the vertical pipe 102 in this example is substantially greater than the flow 96 through the valves A & B (that is, flow rate B>>flow rate A), although in other examples the flows may be substantially equal or otherwise related.

A spacing (dist. B) between the devices 60 when they are deployed into the system can be calculated as follows: dist. B=dist. A*$(ID_A^2/ID_B^2)$*(flow rate B/flow rate A), where dist. A is a spacing between the devices 60 prior to entering the pipe 102, $ID_A$ is an inner diameter of a pipe 106 connected to the pipe 102, and $ID_B$ is an inner diameter of the pipe 102. This assumes circular pipes 102, 106. Where corresponding passages are non-circular, the term $ID_A^2/ID_B^2$ can be replaced by an appropriate ratio of passage areas.

The spacing between the plugging devices 60 in the system (dist. B) can be automatically controlled by varying one or both of the flow rates A,B. For example, the spacing can be increased by increasing the flow rate B or decreasing the flow rate A. The flow rate(s) A,B can be automatically adjusted in response to changes in process conditions, opening parameters, flow rate variations, etc.

In some circumstances, the desired deployment spacing (dist. B) may be greater than what can be produced using a convenient spacing dist. A of the devices 60 and the flow rate A in the pipe 106. The deployment spacing B may be increased by adding spacers 108 between the devices 60 in the pipe 106. The spacers 108 effectively increase the distance A between the devices 60 in the pipe 106 (and, thus, increase the value of dist. A in the equation above).

The spacers 108 may be dissolvable or otherwise dispersible, so that they dissolve or degrade when they are in the pipe 102 or thereafter. In some examples, the spacers 108 may be geometrically the same as, or similar to, the devices 60.

Note that the apparatus 100 may be used in combination with the restriction 98 of FIG. 15 (for example, with the restriction 98 connected downstream of the valve B but upstream of the pipe 102). In this manner, a frangible or other protective coating on the devices 60 and/or spacers 108 can be opened, broken or otherwise damaged prior to the devices and spacers entering the pipe 102.

Figure 17:
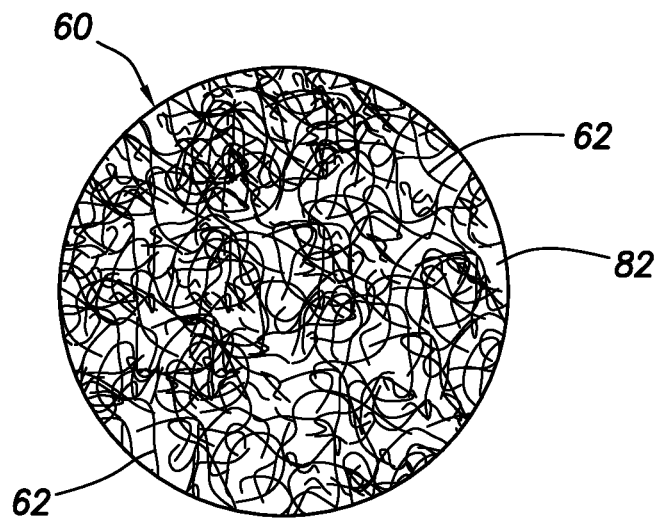
FIGS. 17-19 are representative views of additional examples of the plugging device.

Referring additionally now to FIG. 17, a cross-sectional view of another example of the device 60 is representatively illustrated. The device 60 may be used in any of the systems and methods described herein, or may be used in other systems and methods.

In this example, the body of the device 60 is made up of filaments or fibers 62 formed in the shape of a ball or sphere. Of course, other shapes may be used, if desired.

The filaments or fibers 62 may make up all, or substantially all, of the device 60. The fibers 62 may be randomly oriented, or they may be arranged in various orientations as desired.

In the FIG. 17 example, the fibers 62 are retained by the dissolvable, degradable or dispersible material 82. In addition, a frangible coating may be provided on the device 60, for example, in order to delay dissolving of the material 82 until the device has been deployed into a system (as in the example of FIG. 15).

The device 60 of FIG. 17 can be used for blocking flow through openings in pressure vessels, heat exchangers, fractioning towers, other vessels and other types of process equipment. One advantage of the FIG. 17 device 60 is that it is capable of sealing on irregularly shaped openings, perforations, leak paths or other passageways. The device 60 can also tend to "stick" or adhere to an opening, for example, due to engagement between the fibers 62 and structure surrounding (and in) the opening. In addition, there is an ability to selectively seal openings.

The fibers 62 could, in some examples, comprise wool fibers. The device 60 may be reinforced (e.g., using the material 82 or another material) or may be made entirely of fibrous material with a substantial portion of the fibers 62 randomly oriented.

The fibers 62 could, in some examples, comprise metal wool, or crumpled and/or compressed wire. Wool may be retained with wax or other material (such as the material 82) to form a ball, sphere, cylinder or other shape.

In the FIG. 17 example, the material 82 can comprise a wax (or eutectic metal or other material) that melts at a selected predetermined temperature. A wax device 60 may be reinforced with fibers 62, so that the fibers and the wax (material 82) act together to block an opening or other passageway.

Figure 18:
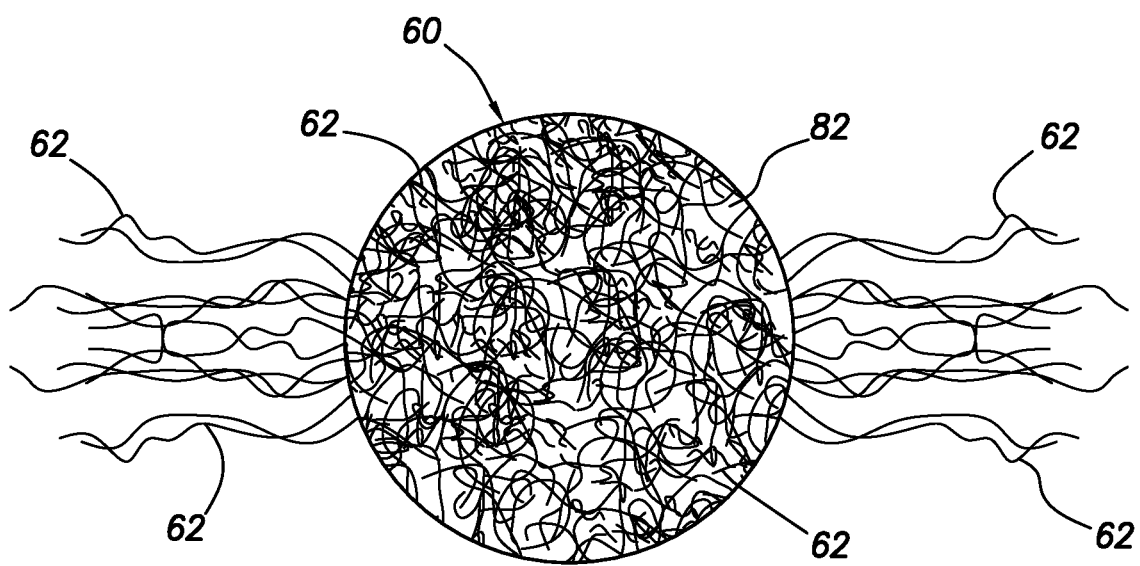

In the FIG. 18 example, the fibers 62 extend outwardly from the main central body of the flow conveyed plugging device 60. The fibers 62 extending from the body may be joined together to form one or more lines, ropes, yarns or fabrics, as in the examples of FIGS. 9A-10. The outwardly extending fibers 62 may enhance fluid drag on the plugging device 60 and/or may enhance an ability of the plugging device to seal off irregular shaped openings.

Figure 19:
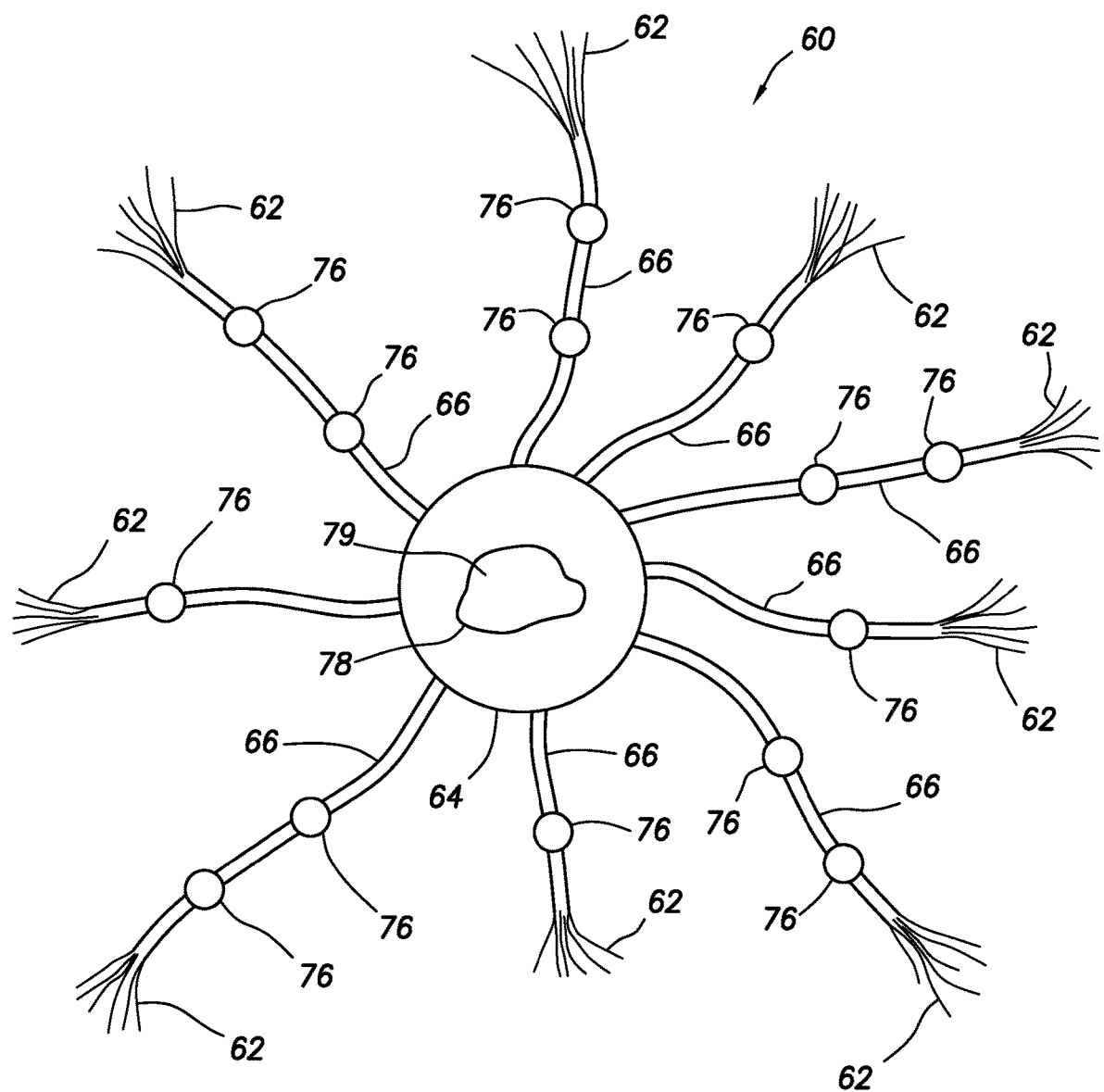

Referring additionally now to FIG. 19, another example of the plugging device 60 is representatively illustrated. This example is similar in some respects to the FIGS. 9A, 10 & 18 examples, in that the fibers 62 extend outwardly from the main central body 64.

In the FIG. 19 example, the fibers 62 are joined together to form multiple ropes, yarns, fabrics or other types of lines 66. In addition, enlarged bodies 76 are formed on the lines 66, such as, by tying knots in the lines or otherwise enlarging a geometry of each of the lines. Note that, in this example, each of the enlarged bodies 76 is smaller than the main central body 64.

The FIG. 19 example also includes a substance 79 therein for modifying a density or buoyancy of the plugging device 60. The substance 79 could comprise a gas or other relatively low density material for reducing the bulk density of the plugging device 60. The substance 79 could comprise a relatively high density material for increasing the bulk density of the plugging device 60.

The substance 79 may be contained in an enclosure 78 positioned in the body 64 or other location in the plugging device 60. The enclosure 78 could, for example, comprise a bladder as described above, for permitting pressure to be applied to the substance 79 in the enclosure (e.g., to allow a gas to change phase to a liquid in response to increased pressure, and to allow the liquid to change phase to the gas in response to decreased pressure).

Alternatively, a change in volume of the enclosure 78 itself (such as, due to a change in pressure and/or temperature in a process) can in some examples cause a corresponding change in bulk density or buoyancy of the plugging device 60 (e.g., as the volume expands, the bulk density decreases and buoyancy increases, and as the volume contracts, the bulk density increases and buoyancy decreases). However, note that it is not necessary for the volume of the enclosure 78 to change significantly in response to changes in pressure or temperature as, for example, in the case of gas-filled glass beads used to decrease the bulk density of the plugging device 60.

Figure 20:
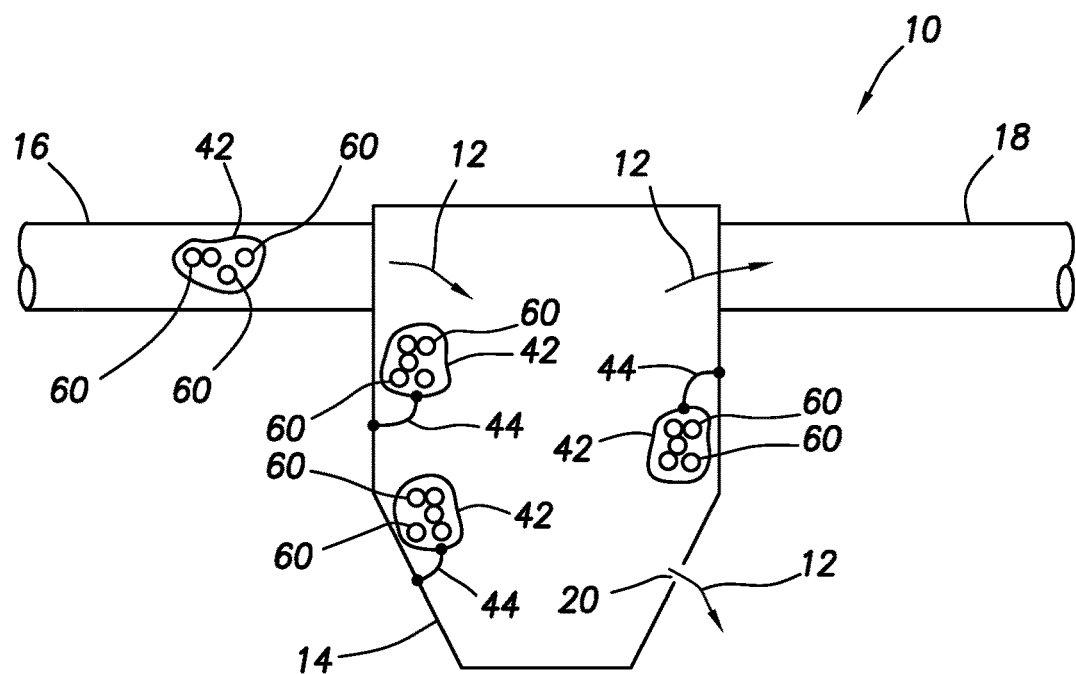
FIGS. 20 & 21 are representative partially cross-sectional views of another example of the system and method.
Figure 21:
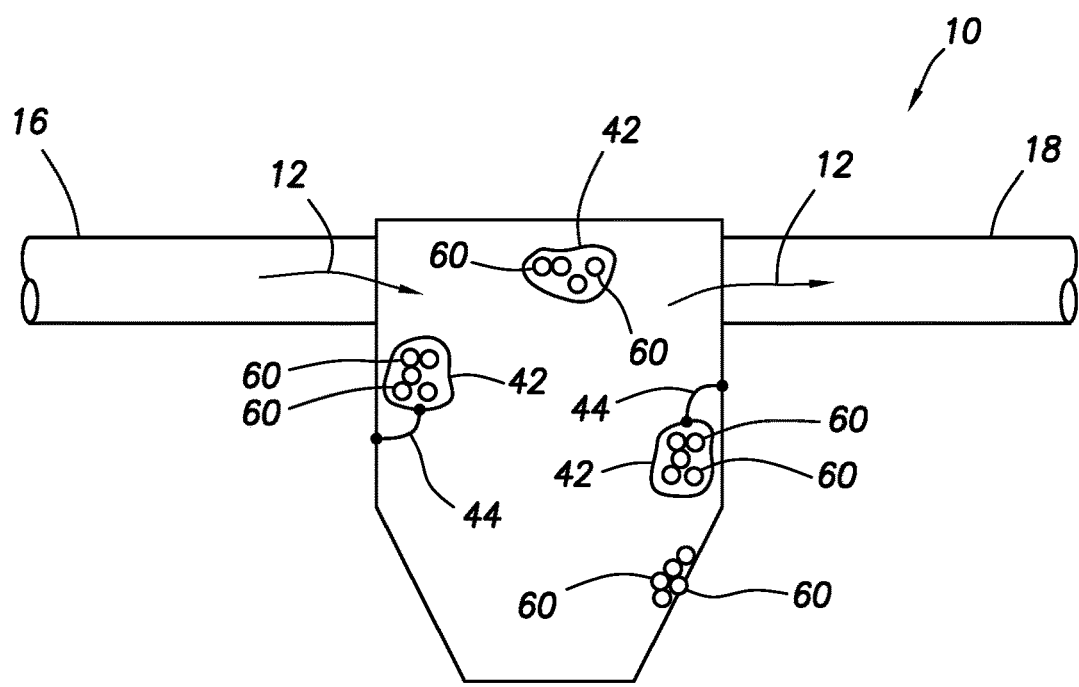

Referring additionally now to FIGS. 20 & 21, another example of the system 10 and method is representatively illustrated. In this example, the plugging devices 60 are contained within enclosures 42 positioned in the vessel 14 and/or conduits 16, 18. The enclosures 42, with the plugging devices 60 therein, may be continuously, periodically or intermittently flowed through the vessel 14 with the fluid 12, or the enclosures 42 may be introduced into the vessel (for example, using a deployment apparatus 30, 90, 100) upon detection of an undesired opening 20 or leakage of the fluid 12 from the vessel (for example, using the detection equipment described above).

The enclosure 42 may be in the form of a wrapper, bag, balloon, membrane or sheet material. The enclosure 42 may be degradable, self-degrading or non-degradable. The enclosure 42 may be similar to any of those described in US Publication Nos. 2017/0030169, 2017/0275965 and 2017/0260828, the entire disclosures of which are incorporated herein by this reference.

The enclosure 42 may be tied or tethered, so that the enclosure and the plugging devices 60 therein are continuously exposed to the fluid 12 in the vessel 14 or conduits 16, 18. As depicted in FIG. 20, multiple enclosures 42 are secured to an interior surface of the vessel 14 by tethers 44. One or more enclosures 42 may be released in response to detection of a leak through an undesired opening 20 (such as, in response to a pressure decrease, a flow rate increase, a temperature increase, etc., in the vessel 14, which may be detected by the detection equipment).

The enclosures 42 (with the plugging devices 60 therein) may have different bulk densities or buoyancies to facilitate plugging openings at corresponding different vertical locations in the vessel 14. Alternatively, or in addition, a single enclosure 42 could have multiple devices 60 therein having different densities, buoyancies or sizes.

When an enclosure 42 with the devices 60 therein is conveyed by flow to an opening 20, the enclosure may initially engage the opening and thereby restrict flow through the opening. The enclosure 42 may then tear, break, burst or otherwise open, and thereby permit the devices 60 to be released from the enclosure.

The released devices 60 can then engage the opening 20 to thereby prevent flow through the opening. One benefit of the enclosure 42 is that it delivers a "concentrated" group of the devices 60 to the opening 20 to be plugged, as depicted in FIG. 21. Any devices 60 that do not engage the opening 20 can be retrieved from the vessel 14 and/or conduits 16, 18 (for example, using the filter 24 of FIG. 3).

A drag coefficient of the device 60 in any of the examples described herein may be modified appropriately to produce a desired result. For example, it may in some circumstances be desirable to preferentially block openings in a certain location in a vessel. The location could be at the openings through which the most fluid 12 is leaking. For these situations and others, the device 60 shape, size, density and other characteristics can be selected, so that the device tends to be conveyed by flow to a certain location in the vessel.

A diameter of the device 60 and the free fiber 62 length can be appropriately selected, so that the device is more suited to stopping and sealingly engaging openings anywhere along the interior of the vessel. The free fibers 62 of the FIGS. 9-11B, 18 & 19 examples greatly increase the ability of the device 60 to engage the first unblocked opening (or other leak path) it encounters.

In examples of the device 60 where a wax material (such as the material 82) is used, the fibers 62 (including the body 64, lines 66, knots, etc.) may be treated with a treatment fluid that repels wax (e.g., during a molding process). This may be useful for releasing the wax from the fibrous material after fracturing or otherwise compromising the retainer 80 and/or a frangible coating thereon.

Suitable release agents are water-wetting surfactants (e.g., alkyl ether sulfates, high hydrophilic-lipophilic balance (HLB) nonionic surfactants, betaines, alkyarylsulfonates, alkyldiphenyl ether sulfonates, alkyl sulfates). The release fluid may also comprise a binder to maintain the knot or body 64 in a shape suitable for molding. One example of a binder is a polyvinyl acetate emulsion.

Broken-up or fractured devices 60 can have lower Cd. Broken-up or fractured devices 60 can have smaller cross-sections and can pass through restrictions in conduits or passageways more readily.

The restriction 98 (see FIG. 15) may be connected in any line or pipe that the devices 60 are flowed through, in order to cause the devices to fracture as they pass through the restriction. This may be used to break up and separate devices 60 into wax and non-wax parts. The restriction 98 may also be used for rupturing a frangible coating covering a soluble wax material 82 to allow water or other process fluids to dissolve the wax.

Fibers 62 may extend outwardly from the device 60, whether or not the body 64 or other main structure of the device also comprises fibers. For example, a ball (or other shape) made of any material could have fibers 62 attached to and extending outwardly therefrom. Such a device 60 will be better able to find and cling to openings, holes or other leak paths, as compared to the ball (or other shape) without the fibers 62.

For any of the device 60 examples described herein, the fibers 62 may not dissolve, disperse or otherwise degrade in the system 10. In such situations, the devices 60 (or at least the fibers 62) may be removed from the system 10 by swabbing, scraping, circulating, filtering or other mechanical methods.

In situations where it is desired for the fibers 62 to dissolve, disperse or otherwise degrade in the system 10, nylon is a suitable acid soluble material for the fibers. Nylon 6 and nylon 66 are acid soluble and suitable for use in the device 60. At relatively low process temperatures, nylon 6 may be preferred over nylon 66, because nylon 6 dissolves faster or more readily.

Self-degrading fiber devices 60 can be prepared from poly-lactic acid (PLA), poly-glycolic acid (PGA), or a combination of PLA and PGA fibers 62. Such fibers 62 may be used in any of the device 60 examples described herein.

Fibers 62 can be continuous monofilament or multifilament, or chopped fiber. Chopped fibers 62 can be carded and twisted into yarn that can be used to prepare fibrous flow conveyed devices 60.

PLA and/or PGA fibers 62 may be coated with a protective material, such as calcium stearate, to slow its reaction with water and thereby delay degradation of the device 60. Different combinations of PLA and PGA materials may be used to achieve corresponding different degradation times or other characteristics.

PLA resin can be spun into fiber of 1-15 denier, for example. Smaller diameter fibers 62 will degrade faster. Fiber denier of less than 5 may be most desirable. PLA resin is commercially available with a range of melting points (e.g., 140 to 365° F.). Fibers 62 spun from lower melting point PLA resin can degrade faster.

PLA bi-component fiber has a core of high-melting point PLA resin and a sheath of low-melting point PLA resin (e.g., 140° F. melting point sheath on a 265° F. melting point core). The low-melting point resin can hydrolyze more rapidly and generate acid that will accelerate degradation of the high-melting point core. This may enable the preparation of a plugging device 60 that will have higher strength in a process environment, yet still degrade in a reasonable time. In various examples, a melting point of the resin can decrease in a radially outward direction in the fiber.

All of the materials for making plugging devices 60 described in this disclosure can be in the form of staple fiber or filament that is formed into yarn. The yarn can be then twisted or braided into cord or rope, or twisted into a larger yarn that can be used directly to make plugging devices 60.

Use of staple fiber (e.g., chopped fiber) typically involves additional preliminary steps of carding and one or more drawing steps before spinning into yarn. Open end spinning, ring spinning, and air jet spinning can be used to form the basic yarn from staple fiber. Open end spinning may be preferable, because it typically uses fewer drawing steps than the other spinning techniques, and a heavier yarn (e.g., thread count <4) can be made.

Multiple yarns can be twisted together to prepare plied yarn (e.g., 10 ply or 12 ply) that can be used to make plugging devices 60. As an alternative to plied yarns, DREF spinning (friction spinning), can be used to make a large-diameter yarn without a subsequent plying step. DREF spinning typically uses a monofilament as a base for the staple fiber to form around.

Staple fiber of thermoplastic polymers (e.g., nylon, polyester, polylactic acid, etc.) can be prepared by melt spinning. Polymers not amenable to melt spinning (e.g., rayon, polyaramid, acrylic, polybenzimidazole) may be dissolved in solvent and spun in either a wet or dry process for solvent removal. After spinning, drawing, crimping, and chopping steps produce a staple fiber that can be used in the yarn-spinning process.

Multiple different polymers can be spun into a single, multi-component fiber. Various core-sheath cross sections are possible (e.g., single core, concentric or eccentric cross section; multiple core, "islands in the sea" cross section; segmented pie cross section). Multi-component fiber in this application can be used to prepare a fiber that has sufficient strength, while degrading in a reasonable time in process environments.

A single component fiber that rapidly degrades may not have sufficient mechanical properties on the time scale of maintenance operations. Conversely, a mono-component fiber with adequate mechanical properties may degrade too slowly to be useful.

Polylactic acid (PLA) degradability is related to the degree of crystallinity and melting point of the polymer. For example, poly(L-lactic acid) is more crystalline and degrades slower than poly(D-lactic acid-co-L-lactic acid). In one example, these two types of PLA can be used together in a bi-component fiber to adjust the degradation rate over a wide temperature range.

In addition to the lower crystallinity PLA degrading faster, acid produced by the hydrolysis will accelerate the degradation of the higher-crystallinity PLA. The lower crystallinity PLA can be used as the sheath (as in fiber made for nonwoven cloth applications), or as the core.

To further expand the usable temperature range available with PLA, other combinations of polymers can be used. Potentially useful polymers include poly(glycolic acid), poly(lactic acid-co-glycolic acid), poly(paradioxanone), poly(ε-caprolactone), poly(L-lactic acid-co-ε-caprolactone), poly(L-lactic acid-co-trimethylene carbonate), poly(ε-caprolactone-co-glycolic acid-co-trimethylene carbonate), polybutylene succinate, poly(3-hydroxybutyrate-co-3-hydroxyvalerate), poly(L-lactic acid-block-ethylene glycol), and polyethylene terephthalate. In all of these examples, the acid produced by the faster-degrading polymer can accelerate the degradation of the more stable polymer.

Polyester hydrolysis is catalyzed by both acids and bases, but base-catalyzed hydrolysis is much faster. For low temperature processes where the desired degradation rate cannot be achieved by the spontaneous hydrolysis of the polyester, the degradation rate can be increased by adding a base or base precursor to the polymer before spinning the fiber, or by coating the fiber. Alkaline earth oxides and hydroxides, (e.g., calcium oxide, magnesium oxide, calcium hydroxide, magnesium hydroxide), zinc oxide, sodium tetraborate, calcium carbonate, hexamethylenetetramine, and urea could be used for this purpose.

Combinations of water-soluble polymer and degradable polymer can be used to make bi-component fibers with higher degradation rates than single-component fibers made from a degradable polymer. The degradable polymers listed above can be used in combination with various water-soluble polymers, including polyethylene oxide, polyvinyl acetate, polyvinyl alcohol, methacrylic acid copolymers, copolymers of 2-ethylhexyl acrylate and dimethylaminoethyl methacrylate, and sulfopolyesters.

For sealing openings in high-temperature processes (e.g., >300° F.), fibers made from common polymers, such as nylon-6 and polyethylene terephthalate, may degrade too rapidly. In high-temperature processes, plugging devices 60 made with fibers comprising hydrolysis-resistant materials could be used.

Potentially suitable materials for use in high-temperature processes include carbon fiber, glass fiber, mineral fiber, ceramic fiber, meta-aramid fiber (e.g., Nomex), para-aramid fiber (e.g., Kevlar), polyacrylonitrile fiber (e.g., Orlon, acrylic, modacrylic), polyparaphenylene sulfide fiber (e.g., Ryton), polybenzanilide, polybenzimidazole fiber (e.g., PBI), polyethylene terephthalate, and fibers made from copolymers and blends. Natural fibers suitable for high temperature include cotton, flax, hemp, sisal, jute, kenaf and coir.

Buoyancy of a plugging device 60 can be increased by incorporating therein a low density material. One suitable material is hollow spheres (such as hollow glass spheres). The low density material could be embedded in the body 64 of the plugging device 60, for example.

Ropes or lines 66 that comprise the plugging device 60 could have selected densities, so that the resulting plugging device is positively, negatively or neutrally buoyant. Examples of such lines include GARLOCK™ PTFE and GFO braided fiber, and X-TREMA™ braided line.

In situations where the fluid 12 comprises a gas, the plugging devices 60 may have an increased surface area, an increased drag coefficient (such as, by providing longer fibers 62), and a decreased density, as compared to plugging devices for use in liquids. The increased surface area, increased drag coefficient and decreased density enables the plugging devices 60 to be readily conveyed by gas flow, and more readily dispersed within a vessel or other process equipment.

It may now be fully appreciated that the above disclosure provides significant advancements to the art of preventing leakage from fluid vessels. In examples described above, the plugging devices 60 can effective block flow through undesired openings 20 in fluid vessels 14, with fluid 12 flow conveying the plugging devices to the openings.

The above disclosure provides to the art a method of plugging at least one undesired opening 20 in a fluid vessel 14. In one example, the method can comprise: introducing one or more plugging devices 60 into the vessel 14; conveying the plugging devices 60 by flow to the opening 20; and blocking the flow through the opening 20 with the plugging devices 60.

The introducing step may comprise continually, periodically or intermittently introducing the plugging devices 60 into the vessel 14. The introducing step may comprise introducing the plugging devices 60 into the vessel 14 in response to an indication that a fluid 12 is leaking from the vessel 14.

The indication may be selected from the group consisting of a pressure change, a flow rate change and a temperature change. The indication may be received by a controller 36 from a sensor 38, and the controller 36 may activate a plugging device deployment apparatus 30 in response to receipt of the indication.

The method may further comprise: retrieving the plugging devices 60; and re-introducing the plugging devices 60 into the vessel 14 after the retrieving step.

The "one or more" plugging devices 60 may comprise multiple plugging devices 60, and the multiple plugging devices 60 may have respective different buoyancies, different sizes, or different densities.

The plugging devices 60 may each comprise a detection device 28 that indicates at least one of a presence, an identity and a characteristic of the respective plugging device 60.

Each of the plugging devices 60 may comprise a main body 64, with lines 66 extending outwardly from the main body 64, and with at least one enlarged body 76 in or on each of the lines 66. The enlarged bodies 76 in or on the lines 66 may each be smaller than the main body 64.

The method may include changing a buoyancy of each of the plugging devices 60 in the vessel 14. The buoyancy changing may comprise changing a phase of a substance 79 in each of the plugging devices 60.

The substance 79 may comprise a gas contained in an enclosure 78 in the plugging device 60. The phase change may be due to a change in at least one of pressure and temperature in the vessel 14.

The "one or more" plugging devices 60 may comprise multiple plugging devices 60, and the conveying step may include conveying the plugging devices 60 in an enclosure 42 in the vessel 14. The blocking step may comprise releasing the plugging devices 60 from the enclosure 42.

A system 10 for plugging at least one undesired opening 20 in a fluid vessel 14 is also provided to the art by the above disclosure. In one example, the system 10 can include a deployment apparatus 30 configured to introduce one or more plugging devices 60 into the vessel 14, a sensor 38 that measures a physical parameter indicative of leakage from the vessel 14, and a controller 36 that activates an actuator 34 of the deployment apparatus 30 in response to receipt from the sensor 38 of an indication of leakage from the vessel 14.

The indication may be selected from the group consisting of a pressure change, a flow rate change and a temperature change.

The system 10 may include a filter 24 that separates the plugging devices 60 from fluid 12 flow from the vessel 14.

The "one or more" plugging devices 60 may comprise multiple plugging devices 60, and the multiple plugging devices 60 may have respective different buoyancies, different sizes, and/or different densities.

The plugging devices 60 may each comprise a detection device 28 that indicates at least one of a presence, an identity and a characteristic of the respective plugging device 60.

The "one or more" plugging devices 60 may be contained within an enclosure 42 conveyed by fluid 12 flow in the vessel 14. The plugging devices 60 may be released from the enclosure 42 in response to engagement of the enclosure 42 with the opening 20.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of plugging at least one undesired opening in a fluid vessel, the method comprising:
   introducing one or more plugging devices into the vessel;
   conveying the plugging devices by flow to the opening, the conveying comprising conveying the plugging devices in an enclosure in the vessel; and
   blocking the flow through the opening with the plugging devices.

2. The method of claim 1, in which the introducing comprises continually introducing the plugging devices into the vessel.

3. The method of claim 1, in which the introducing comprises periodically introducing the plugging devices into the vessel.

4. The method of claim 1, in which the introducing comprises intermittently introducing the plugging devices into the vessel.

5. The method of claim 1, in which the introducing comprises introducing the plugging devices into the vessel in response to an indication that a fluid is leaking from the vessel.

6. The method of claim 5, in which the indication is selected from the group consisting of a pressure change, a flow rate change and a temperature change.

7. The method of claim 5, in which the indication is received by a controller from a sensor, and the controller activates a plugging device deployment apparatus in response to receipt of the indication.

8. The method of claim 1, further comprising:
retrieving the plugging devices; and
re-introducing the plugging devices into the vessel after the retrieving.

9. The method of claim 1, in which the one or more plugging devices comprise multiple plugging devices, and in which the multiple plugging devices have respective different buoyancies.

10. The method of claim 1, in which the one or more plugging devices comprise multiple plugging devices, and in which the multiple plugging devices have respective different sizes.

11. The method of claim 1, in which the one or more plugging devices comprise multiple plugging devices, and in which the multiple plugging devices have respective different densities.

12. The method of claim 1, in which the plugging devices each comprise a detection device that indicates at least one of a presence, an identity and a characteristic of the respective plugging device.

13. A method of plugging at least one undesired opening in a fluid vessel, the method comprising:
introducing one or more plugging devices into the vessel;
conveying the plugging devices by flow to the opening; and
blocking the flow through the opening with the plugging devices,
in which each of the plugging devices comprises a main body, with lines extending outwardly from the main body, and with at least one enlarged body in or on each of the lines.

14. The method of claim 13, in which the enlarged bodies in or on the lines are each smaller than the main body.

15. A method of plugging at least one undesired opening in a fluid vessel, the method comprising:
introducing one or more plugging devices into the vessel;
changing a buoyancy of each of the plugging devices in the vessel;
conveying the plugging devices by flow to the opening; and
blocking the flow through the opening with the plugging devices.

16. The method of claim 15, in which the buoyancy changing comprises changing a phase of a substance in each of the plugging devices.

17. The method of claim 16, in which the substance comprises a gas contained in an enclosure in the plugging device.

18. The method of claim 16, in which the phase change is due to a change in at least one of pressure and temperature in the vessel.

19. The method of claim 1, in which the blocking comprises releasing the plugging devices from the enclosure.

20. A system for plugging at least one undesired opening in a fluid vessel, the system comprising:
a deployment apparatus configured to introduce one or more plugging devices into the vessel;
a sensor that measures a physical parameter indicative of leakage from the vessel; and
a controller that automatically activates an actuator of the deployment apparatus in response to receipt from the sensor of an indication of leakage from the vessel.

21. The system of claim 20, in which the indication is selected from the group consisting of a pressure change, a flow rate change and a temperature change.

22. The system of claim 20, further comprising a filter that separates the plugging devices from fluid flow from the vessel.

23. The system of claim 20, in which the one or more plugging devices comprise multiple plugging devices, and in which the multiple plugging devices have respective different buoyancies.

24. The system of claim 20, in which the one or more plugging devices comprise multiple plugging devices, and in which the multiple plugging devices have respective different sizes.

25. The system of claim 20, in which the one or more plugging devices comprise multiple plugging devices, and in which the multiple plugging devices have respective different densities.

26. The system of claim 20, in which the plugging devices each comprise a detection device that indicates at least one of a presence, an identity and a characteristic of the respective plugging device.

27. A system for plugging at least one undesired opening in a fluid vessel, the system comprising:
a deployment apparatus configured to introduce one or more plugging devices into the vessel;
a sensor that measures a physical parameter indicative of leakage from the vessel; and
a controller that activates an actuator of the deployment apparatus in response to receipt from the sensor of an indication of leakage from the vessel,
in which each of the plugging devices comprises a main body, with lines extending outwardly from the main body, and with at least one enlarged body in or on each of the lines.

28. The system of claim 27, in which the enlarged bodies in or on the lines are each smaller than the main body.

29. A system for plugging at least one undesired opening in a fluid vessel, the system comprising:
a deployment apparatus configured to introduce one or more plugging devices into the vessel;
a sensor that measures a physical parameter indicative of leakage from the vessel; and
a controller that activates an actuator of the deployment apparatus in response to receipt from the sensor of an indication of leakage from the vessel,
in which a buoyancy of each of the plugging devices changes in the vessel.

30. The system of claim 29, in which the buoyancy change comprises a phase change of a substance in each of the plugging devices.

31. The system of claim 30, in which the substance comprises a gas contained in an enclosure in the plugging device.

32. The system of claim 30, in which the phase changes in response to a change in at least one of pressure and temperature in the vessel.

33. The system of claim 20, in which the one or more plugging devices are contained within an enclosure conveyed by fluid flow in the vessel.

34. The system of claim 33, in which the plugging devices are released from the enclosure in response to engagement of the enclosure with the opening.

* * * * *